United States Patent
Hazzard et al.

(10) Patent No.: US 12,478,711 B2
(45) Date of Patent: *Nov. 25, 2025

(54) COMPOSITE SHEETS AND MEDICAL IMPLANTS COMPRISING SUCH SHEETS

(71) Applicant: DSM IP ASSETS B.V., Heerlen (NL)

(72) Inventors: Mark Kenneth Hazzard, Echt (NL); Noel L. Davison, Echt (NL); Mandy Maria Jozefina Wiermans, Echt (NL); Nicolaes Hubertus Maria De Bont, Echt (NL); Loes Heleen Pluymen, Echt (NL)

(73) Assignee: DSM IP ASSETS B.V., Maastricht (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/718,647

(22) PCT Filed: Dec. 12, 2022

(86) PCT No.: PCT/EP2022/085372
§ 371 (c)(1),
(2) Date: Jun. 11, 2024

(87) PCT Pub. No.: WO2023/110744
PCT Pub. Date: Jun. 22, 2023

(65) Prior Publication Data
US 2025/0032674 A1    Jan. 30, 2025

(30) Foreign Application Priority Data
Dec. 13, 2021 (EP) ..................... 21214206

(51) Int. Cl.
*A61L 27/48* (2006.01)
*B32B 27/40* (2006.01)

(52) U.S. Cl.
CPC .............. *A61L 27/48* (2013.01); *B32B 27/40* (2013.01); *A61L 2430/20* (2013.01);
(Continued)

(58) Field of Classification Search
None
See application file for complete search history.

(56) References Cited

U.S. PATENT DOCUMENTS

| 12,171,905 B2 * | 12/2024 | De Bont | C08G 18/48 |
| 12,171,906 B2 * | 12/2024 | De Bont | A61L 27/16 |
| 2023/0310718 A1 * | 10/2023 | Davison | A61L 27/48 424/424 |

FOREIGN PATENT DOCUMENTS

WO    2020178227 A1    9/2020

OTHER PUBLICATIONS

International Search Report and Written Opinion of the ISA for PCT/EP2022/085372, mailed Mar. 20, 2023, 12 pages.

* cited by examiner

*Primary Examiner* — Arti Singh-Pandey
(74) *Attorney, Agent, or Firm* — NIXON & VANDERHYE P.C.

(57) ABSTRACT

Disclosed herein are composite sheets and prosthetic medical devices formed therefrom. In an embodiment, a composite sheet has a thickness of 25-250 μm and comprises 10-70 mass %, based on the total mass of the composite sheet, of a knit fabric having thickness of 15-225 μm and comprising strands of 2-50 dtex, the strands comprising biocompatible polymer fibers, the strands comprising biocompatible polymer fibers, wherein the fabric comprises a thickness in a plurality of first locations, and pores in a plurality of second locations; and 30-90 mass %, based on the total mass of the composite sheet, of a polyurethane coating, wherein the polyurethane coating coats the fabric (Continued)

(A)

(B)

(C)

(D)

and fills the pores of the fabric such that the composite sheet is substantially impermeable to water.

16 Claims, 5 Drawing Sheets

(52) U.S. Cl.
CPC ....... *B32B 2255/02* (2013.01); *B32B 2255/26* (2013.01); *B32B 2262/0253* (2013.01); *B32B 2270/00* (2013.01); *B32B 2307/538* (2013.01); *B32B 2307/546* (2013.01); *B32B 2307/7265* (2013.01)

COMPOSITE SHEETS AND MEDICAL IMPLANTS COMPRISING SUCH SHEETS

This application is the U.S. national phase of International Application No. PCT/EP2022/085372 filed Dec. 12, 2022. which designated the U.S. and claims priority to EP patent application Ser. No. 21/214,206.1 filed Dec. 13, 2021, the entire contents of each of which are hereby incorporated by reference.

FIELD

The disclosed invention pertains to a composite sheet suitable for making a medical implant component like a leaflet for a prosthetic heart valve, a method of making such composite sheet, to use of said composite sheet in making a medical implant, and to a medical implant, such as a heart valve prosthesis, comprising such composite sheet.

BACKGROUND

Heart valve diseases are among the leading causes of death. Heart valve diseases may result in disturbances in the controlled flow of blood in and out of the heart and its chambers during cardiac cyclic loading of about 30 million times a year. Although it is preferred to surgically repair a diseased valve, each year some 300,000 patients need to undergo valve replacement surgery worldwide. This number is projected to grow rapidly with the increasing average age of the population.

The clinical use of heart valve prostheses started already more than half a century ago. Initially, mechanical valves made from metal-carbon combinations were used and showed high durability. However, such valves are typically prone to infection, inflammation and thrombosis, requiring lifelong use of anti-coagulation medication by the patient. In addition, implantation of such valve requires open-heart-surgery, which may be unsuitable for many patients.

Subsequently, so-called bioprosthetic valves were introduced. Such valves typically apply a xenograft, like chemically crosslinked bovine or porcine pericardium, for the valve leaflets, which leaflets are mounted in a support structure. These bioprosthetic valves may experience calcification leading to thickening and stiffening, and eventually to insufficient opening and closing of the valve. The lifetime of such valves is limited to about 7-10 years. Yet, bioprosthetic valves have become the gold standard and provide a distinct advantage over mechanical valves because they can be made as collapsible/expandable prostheses that can be implanted using minimally invasive techniques, like Transcatheter Aortic Valve Replacement (TAVR) or Implantation (TAVI).

Typically, such bioprosthetic heart valves have a one-way valve structure, also called valve assembly or leaflet assembly, mounted in a support structure also referred to as stent or frame, which may be made from a metal like nitinol or a polymer. In case of collapsible/expandable prostheses, the stented valve can be self-expanding or balloon expandable. The valve assembly may consist of two or (mostly) three leaflets, and a skirt or cuff to which the leaflets are attached. The skirt, and therewith leaflets, is attached to and at least partly covers the inner and/or outer surface of the stent and may aid in preventing or reducing leakage around the outside of the valve (often called paravalvular leakage). The skirt may also be made from treated natural tissue, but is generally based on synthetic material, like a polyester fabric or a polytetrafluoroethylene film. Said components may be attached to the stent in various ways, like by suturing, gluing or heat bonding. Each leaflet has a free edge, also called free margin, which edges move toward each other to coapt and to close the valve, and which move toward the inner wall of the support structure to open the valve under changing blood pressure.

Research on alternative approaches to make prosthetic valves that could function longer than present 5 to 10 years of bioprosthetic valves, include applying synthetic materials and tissue engineering, and gained much attention during last decades. Tissue engineering aims to generate implantable tissues by encapsulating or seeding cells in biodegradable scaffolds, culturing the cell constructs under appropriate conditions in bioreactors, and implanting the pre-conditioned constructs to gradually acquire the characteristics of native tissue in vivo. Such technologies are not ready yet for clinical application.

Requirements for synthetic materials that can be used in implants in general relate to biocompatibility, biodegradability vs biostability, mechanical properties like strength, and purity (i.e. free from toxic substances and additives like lubricants and sizing agents). As minimally invasive approaches for prosthetic heart valves are becoming more and more adopted in view of clinical benefits like faster recovery time of patients, the need for a lower profile of devices used also increases. This requires that materials for leaflets and skirts have certain pliability, allowing compacting and compressing to fit within a narrow delivery system. Using lower thickness materials may appear a logical choice but can negatively affect long term properties and performance of the material in use. Another limitation in choosing a synthetic leaflet material may be the design paradigm that a prosthetic heart valve should closely mimic the natural valve design, and that the valve assembly should be a cusp with leaflets that are cup-shaped or have a belly to provide the necessary durability and blood flow dynamics (hemodynamics) that will not induce clotting. To create such valve design, typically applied methods comprise either making a shaped leaflet or leaflet assembly by coating or heat forming material on a mold or mandrel, or by cutting a shape from a sheet-like material and assembling three pieces into a 3-dimensional leaflet assembly, for example by suturing leaflets to each other and to a skirt and/or stent.

Numerous synthetic polymers have been proposed and/or evaluated as material for making valve leaflets, but so far, such synthetic heart valves have not found clinical use. Bezuidenhout et al. addressed such research in a review article, with a focus on polyurethanes, a class of segmented copolymers having elastomeric properties that has been widely investigated for such biomedical use (see DOI: 10.1016/j.biomaterials.2014.09.013). Classical polyurethanes comprising polyester or polyether soft segments were found to be prone to hydrolytic and/or oxidative degradation, and calcification and thrombosis was observed in animal tests with valve prostheses. Valves based on alternative polyurethanes, comprising segments based on polycarbonates and/or polysiloxanes, showed promising results regarding durability and hemodynamics.

In order to increase mechanical properties and durability of synthetic valves, use of various composite materials has also been proposed. The term composite is generally a material made up of two or more distinct, structurally complementary components, such as a matrix material and a reinforcing material. A composite sheet is a composite material in sheet form.

One of the advantages indicated is to make a material having certain anisotropy, like a natural valve leaflet that has a complex multilayer structure comprising elastic sheet-like material (elastin) and fibrous structures (collagen) oriented in different directions.

In US2003/0114924A1 a three-leaflet prosthetic heart valve is described, which is molded as one piece from a thermoplastic polyurethane. The valve has leaflets with certain curvature and thickness variation, and leaflets are separated from each other by a gap in unstressed state; requiring stretching of leaflet material to go to open and closed positions as in a natural valve.

A method of making a heart valve by reaction-injection molding of polyurethane compositions is described in US2018/0016380A1. Herein valve leaflets are made that comprise a partially crosslinked polyurethane based on an aromatic diisocyanate, a chain extender, a crosslinker and a soft segment like hydrogenated polybutadiene diol. Crosslinking the polyurethane would reduce degradation and strain relaxation in use.

EP0331345A2 relates to a heart valve prosthesis that has a frame and three leaflets, wherein the leaflets have been made from a triaxially woven fabric. Such fabric enables making leaflets that show more stretch in the radial than in circumferential direction of the valve. By using different fibers, for example high-strength fibers and elastomeric fibers, in strands of the woven such two way stretch behavior can be enhanced. It is further indicated that the woven may be embedded in an elastomeric matrix, for example in a polyurethane. Tri-axial weaving, however, is a complex technique requiring special equipment.

US2005/0177227A1 discloses a method of making a valve prosthesis from a textile material, like a polyester woven fabric, by shaping the textile on a shaping member to reproduce the geometry of a three-leaflet human valve, by e.g. cutting parts and heat forming the textile.

Cacciola et al. (Journal of Biomechanics, 33(6) (2000), p 653-658 and NL1008349) described a method of making a synthetic fiber-reinforced heart valve, wherein a shaped mandrel is first provided with a layer of EPDM rubber by solution coating, then reinforcing UHMWPE fibers are applied by winding thereon, and finally a second layer of rubber is applied.

WO2002/24119A1 relates to a valve prosthesis having leaflets formed from a polymer, the leaflets having a reinforcing member at the free edge for coaptation, resulting in the edge having a flexural rigidity that is up to three times greater than the unreinforced portions of the leaflet. The polymer for the leaflet may be chosen from a long list; polyurethanes, polysiloxanes and polytetrafluoroethylenes are mentioned as preferred materials. Suitable reinforcing members may be in the form of a strip or fibers and may be based on metals, polymer composites, carbon materials or other polymers that are stronger than the polymer of the leaflet. Leaflets may be made by different methods, typically by a dip coating process using a shaped mandrel.

US2003/0078652A1 discloses a stent-less heart valve prosthesis that includes leaflets of a laminated composite, wherein fibers are oriented along lines of stress in the material in use; to increase strength at critical points that would otherwise be foci for material failure. Such leaflets can be made by laying fibers in specific orientation over a curved mold, to which polymer sheets are laminated.

US2010/0249922A1 describes prosthetic heart valve leaflets made from a composite material comprising a knitted or woven fabric that is covered by or embedded in a flexible polymer. The composite would be easier stretchable along a first axis than along a second axis, to mimic anisotropic stretching of a natural leaflet. In addition, stretching along both axes can occur in two phases; a first phase wherein stretching is primarily due to deformation of a pattern of strands in the fabric and a second phase wherein stretching is primarily due to elongation of the strands. As suitable fibers for the fabric a number of polymers are mentioned, including polyester, nylon and polyethylene, and the flexible polymer may be for example a polyurethane, silicone, fluoroelastomer or a styrene/isobutylene block-copolymer. The publication does not provide actual sample compositions or properties.

In US2012/0172978A1 leaflets were made by cutting pieces from an isotropic filter made from polyester or polypropylene monofilaments with uniform pores, fusing or sealing the edges to prevent fraying, and assembling the pieces to form a valve, which valve can be collapsed and sterilized.

US2012/0290082A1 describes a transcatheter heart valve prosthesis comprising a support structure and a valve comprising leaflets made of an anisotropic composite material containing a woven fabric that is embedded in an elastomeric matrix and which material is locally reinforced by fibers, that is in regions of high stress during its intended use, in order to locally limit stretching. The composite may contain high-strength polyethylene fibers and a polyurethane as matrix material.

US2013/0274874A1 provides leaflets for a prosthetic valve, which leaflets comprise fibers that are arranged in V-shaped or curved patterns and in an angle relative to the free edge of a leaflet in a valve; resulting in less fibers and lower stiffness at the free edge. Such leaflets can be made by casting fibers into an elastomeric matrix, or by sandwiching and bonding fibers between two layers of elastic matrix. As suitable matrix materials sheets from polytetrafluoroethylene, polyurethane or polyester are mentioned; suitable fibers are based on carbon, aromatic polyester, aromatic polyamide or polyethylene.

US2014/0005772A1 describes making a prosthetic heart valve having three leaflets, wherein a leaflet assembly may be formed by first positioning fibers in one or two directions on a shaped mold, and subsequently applying at least one polyurethane by spray- or dip coating to at least partially embed the fibers in the polyurethane. The leaflets may have a substantially uniform thickness or a gradient in thickness, and may have isotropic or anisotropic mechanical properties.

US2016/0296323A1 discloses a prosthetic heart valve having leaflets made from a composite material comprising electrospun fibers at least partially embedded in a matrix of a polyisobutylene urethane copolymer. The fibers may be made from fluoropolymer, polyester, poly(styrene-isobutylene-styrene) tri-block copolymer (SIBS), or polyurethane, especially from a polyisobutylene urethane copolymer of higher hardness than the matrix. The electrospun fibers may be in the form of a woven to result in composite material with properties that are directionally dependent (anisotropic), or in the form of a non-woven providing an isotropic material. Also multilayered composites are described comprising 3 or more fiber layers, wherein fiber orientation in different layers may be different, for example to provide anisotropic physical and/or mechanical properties. Fibers may then be selected from an extensive list. Compositions, and therewith properties of the composite materials may vary widely but are not exemplified, and optionally various coatings could be applied.

US2016/0296325A1 also relates to prosthetic valves having synthetic leaflets with anisotropic properties, resulting from use of a composite material having a plurality of undulating fibers embedded in a polymer matrix. The fibers may extend in the composite in one or more directions, like extending along the free edge contour of a leaflet made therefrom. The undulated fibers provide the composite multi-stage tensile properties. Upon straining the composite, the undulated fiber will first stretch and once fibers have become straightened, a higher tension will be needed to further elongate the material. Initially, the elongation behavior of the composite material may be similar to the matrix material, whereas once most fibers are straightened the fibers mainly determine extensibility. The document indicates a multitude of synthetic and natural polymer materials from which fibers and matrix may be made, and various ways of making such composites, but without providing details or any specific embodiment.

In US2017/0071729A1 a prosthetic heart valve is described, which valve has leaflets comprising a composite material that has been made by at least partially embedding a plurality of pre-tensioned fibers in a polymer matrix. When tension is removed from the composite, fibers may relax to result in a composite with tensile behavior that may be comparable to the composite with pre-formed undulated fibers as described herein above. The fibers may be made from a metal like nitinol or from a polymer like PEEK, PES or UHMWPE; and the polymer matrix can be a polyurethane based on polyisobutylene soft segments.

In US2017/0065411A1 it is described to use a flexible fabric woven from UHMWPE fibers for making leaflets of a prosthetic heart valve. In view of the low extensibility of such material, an alternate design of leaflets with excess length of the free edges is described.

In US2019/0351099A1 a low-profile composite sheet of 15-250 μm thickness is described, which comprises a textile base layer and fluid impermeable polymer coating heat-laminated therewith and which sheet can be used as skirt or covering material for a heart valve prosthesis. The textile base layer may be a tubular structure comprising high tenacity monofilaments or yarns that are made from a resorbable or non-resorbable polymer, and the base layer can be made by knitting, weaving, braiding, or non-woven textile techniques. The polymer coating can be chosen from a long list of polymers, and may also function to adhere the composite sheet to a substrate; this way reducing or omitting use of sutures.

US2020/0188098A1 relates to polymer-containing fabric materials that may be used in making medical devices like venous valves, occluders, vascular conduits, grafts, skin patches, adhesion barriers and prosthetic heart valves. Fabrics may be made from several polymers including polytetrafluoroethylenes, polypropylenes, polyethylenes, polyurethanes, polyesters, and polyamides. The fabric may be uncoated, or a polymer film may have been applied to at least a portion of its surface; as one or more layers and/or as patterns of discrete layers on the fabric. The polymer layer may be applied to alter one or more properties of the fabric, like surface roughness, porosity, lubricity, prevent fraying, etc.; but it is indicated that fibers of the fabric mainly determine its properties. In an embodiment, a prosthetic heart valve is described which comprises leaflets that are formed from a high-density woven fabric of 50-100 μm thickness and having warp and weft strands of UHMWPE fibers, wherein fibers typically extend in a direction that is at an angle of 30-60 degrees to a line perpendicular to the free edge of a leaflet in flattened condition (or to a line parallel to the longitudinal axis of the heart valve). Said fabric of the leaflets is at least partially and on at least one side laminated with an UHMWPE film.

US2017/035480A1 relates to a catheter assembly comprising an expandable medical balloon. Positioned on the balloon is a braid that is made from first and second fibers, wherein the second fibers have a higher melting point than the first fibers that may be UHMWPE. A coating, which can be a thermoplastic polyurethane, may have been applied on the outer surface of the braid.

In WO2019/197353A1 a porous hybrid elastomer/polyethylene film is described, wherein at one or more spots, pores of a UHMWPE film have been partly filled with an elastomer like a polyurethane. The hybrid film shows improved resistance to initiation or occurrence of tearing or other failure at the modified spots of the film.

US20210267756 relates to a prosthetic heart valve including a support structure and a valve assembly disposed within the support structure, the valve assembly including a plurality of leaflets. Some leaflet materials include a metal body with a plurality of openings. The metal body may be coated with a polymer.

Despite the approaches as proposed in the above addressed documents, a clinically successful, heart valve prosthesis based on polymeric leaflets appears not yet reality; which may be largely due to the success of bioprosthetic valves, and to limited in vivo durability and thrombotic complications encountered with some prototype valves having polymeric leaflets. There thus still is a need for a synthetic, polymeric material that ideally combines biostability, bio- and hemocompatibility with properties like high pliability and formability, high toughness, sufficient elongation, high strength, and good fatigue resistance; which would enable making a valve prosthesis that combines hemodynamics of a bioprosthetic valve with enhanced durability. Preferably such polymeric material, and prosthetic valves, can be economically and consistently produced.

SUMMARY

Objects of the present disclosure include providing a synthetic material having a combination of properties that mitigates or prevents one or more of the above indicated disadvantages of the prior art materials, and which material is suitable for use in making a durable heart valve prosthesis, and optionally in other biomedical applications.

The aspects and embodiments as described herein below and as characterized in the claims provide a composite sheet of a polyurethane elastomer reinforced with a textile made from biocompatible polymer fibers, which composite sheet combines at least a number of said desired properties, and which composite sheet can be advantageously applied for making components of cardiovascular implants, like skirt and/or leaflets for a prosthetic heart valve.

In an embodiment, the present disclosure provides a composite sheet, wherein the composite sheet comprises:
  10-70 mass %, based on the total mass of the composite sheet, of a knit fabric having thickness of 15-225 μm and comprising strands of 2-50 dtex, the strands comprising biocompatible polymer fibers, the strands comprising biocompatible polymer fibers, wherein the fabric comprises a thickness in a plurality of first locations, and pores in a plurality of second locations; and
  30-90 mass %, based on the total mass of the composite sheet, of a polyurethane coating, wherein the polyurethane coating coats the fabric and fills the pores of the fabric such that the composite sheet is substantially impermeable to water;
and wherein the composite sheet has a thickness of 25-250 μm and optionally an areal density of 10-100 g/m².

In an embodiment, this disclosure provides a method of making a composite sheet comprising:
- providing a knit fabric based on strands of 2-50 dtex that comprises biocompatible, polymer fibers, the fabric having a thickness of 15-225 µm and optionally an areal density of 5-30 g/m$^2$;
- optionally activating the surface of the fabric by pretreating with a high-energy source;
- embedding the fabric with a biocompatible and biostable polyurethane elastomer comprising polysiloxane segments, the polyurethane forming a continuous matrix of the sheet;

to result in a composite sheet that comprises 30-90 mass % of polyurethane, has a thickness of 25-250 µm and. optionally an areal density of 10-100 g/m$^2$.

It was found that such composite sheet is biocompatible and biostable, shows excellent hemocompatibility (which is demonstrated in applications WO2020/178227A1 and WO2020/178228A1), and further may have high strength yet good pliability and formability. In an embodiment, the composite sheet further shows, a 1%-secant modulus of from 1 to 100 MPa, a hardening transition point of from 5 to 70% elongation, and/or a flexural rigidity per unit width of from 1 to 20 N·µm. In an embodiment, the composite sheet further shows, a 1%-secant modulus of from 1 to 100 MPa, a hardening transition point of from 5 to 70% elongation, a flexural rigidity per unit width of from 1 to 20 N·µm, and/or a flexural modulus of from 10 to 200 MPa. In an embodiment, such properties may be achieved in each of two orthogonal directions and the diagonal thereof. In an embodiment, such properties may be achieved in all directions.

Such tensile properties mimic the typical performance of natural tissues like heart leaflets, and of treated pericardium, with initial elongation occurring at relatively low stress, followed by strain hardening after a hardening transition point, which properties enable quick elastic response to pressure changes in the blood and prevent plastic deformation and over-stretching of leaflets.

As the ultimate tensile strength of the present composite sheets is typically higher than stress levels on a leaflet in an implanted prosthetic valve leaflet, it can be anticipated that the composite sheet will also have improved fatigue resistance over treated bovine pericardium material. This would enable making a valve prosthesis with enhanced durability.

Another advantage is that the present composite sheets can apply known and/or commercially available starting materials and may produce the composite sheets with high consistency.

Further aspects of the disclosure concern the use of such composite sheet in making a component for an implantable medical device and the use of such medical implant component in making an implantable medical device; especially said uses concern making one or more leaflets and making a prosthetic heart valve comprising such leaflets.

In other aspects, uses of the composite sheet of the present disclosure include applications wherein the composite sheet will be in contact with body tissue or fluids, such as in orthopedic applications including tissue reinforcement procedures or cardiovascular implants. Examples of materials for soft tissue reinforcement include meshes for hernia repair, abdominal wall reconstruction or degenerative tissue reinforcement.

Cardiovascular implants include devices like a vascular graft, a stent cover, a mesh, or a venous valve or a heart valve prosthesis. In many of such applications suturing is used to connect the implant component to other parts of a device or to surrounding soft or bone tissue.

Other aspects include such medical devices or implants as indicated above, which comprise said composite sheet or medical implant component.

A skilled person will understand that although the experiments are mainly relating to fabrics based on UHMWPE fibers and certain thermoplastic polyurethanes, parts of the disclosures may similarly apply to flexible fabrics made from other fibers and other polyurethanes; as further indicated in the following description.

DETAILED DESCRIPTION

Figure 1:
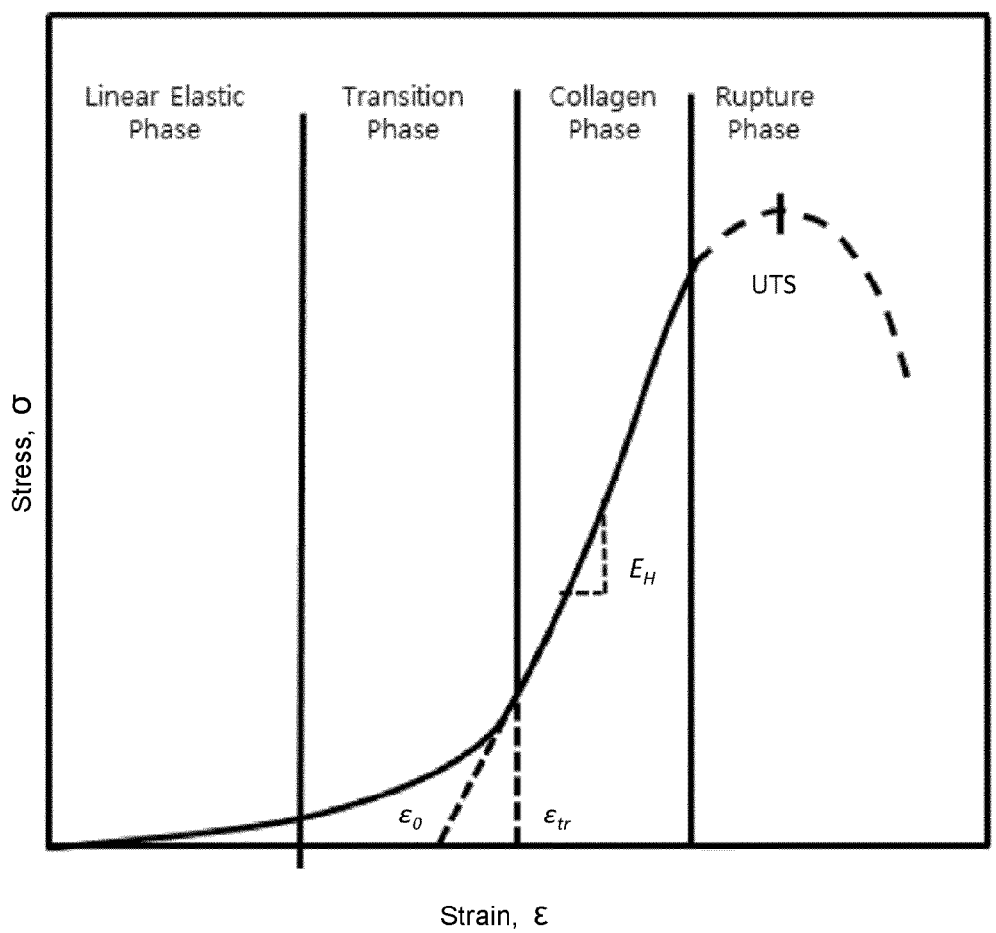
FIG. 1 shows a typical a tensile stress-strain curve for soft biological tissue such as leaflets of human aortic and pulmonary heart valves.

Within the context of the present disclosure the following definitions are used. The term sheet is generally used to mean a thin piece of material such as a piece of paper or a fabric. A fibrous construct is understood to comprise a structure made by interconnecting one or more strands of fibers, for example by interlacing, by using an adhesive or binder, or by partial melting; like a rope, cable, tape or fabric. Ropes, cables and tapes are elongated constructs based on strands or fibers. A fabric is a flexible material comprising a network of fibers, and typically has a thickness much smaller than its width and/or length, like a flat sheet having two sides or surfaces, or a hollow tubular form with inner and outer surfaces. Fabrics include non-wovens, like a felt of randomly oriented fibers or a unidirectional sheet, and fabrics, like structures made by interlacing strands of fibers by techniques like knitting, crocheting, weaving, or braiding. A fabric may be isotropic, that is have similar physical or mechanical properties in different directions; be anisotropic as a result of differences in type, number, and/or orientation of fibers in different directions; and may have a substantially constant thickness or show variations therein, typically related to crossing over of strands. A strand refers to a bundle or assembly of fibers, often used to indicate threads or elements forming a construct. Fiber(s) is a general term referring to one or more slender (thin and long) threadlike structures and encompasses continuous fibers (also called filaments) and/or short fibers (also called staple fibers) and may refer to a single fiber or filament and/or to a yarn. A filament is understood to be a (single) thin thread with a generally round or oblong cross-section with diameter generally below 50 µm and typically made by a (melt or solution) spinning process. A yarn is a continuous bundle of filaments and/or staple fibers, optionally twisted together to enhance yarn coherency. A multi-filament yarn is a bundle of filaments, like at least 5 filaments optionally twisted together to enhance yarn bundle coherency. A spun yarn is a thread made by twisting together staple fibers. High-strength fibers are fibers having a tenacity, sometimes incorrectly equated with (ultimate) tensile strength, of at least 0.6 N/tex.

A composite sheet, like a composite fabric, refers to a construct that combines two or more structural elements; such as a polymer composition as matrix and a fabric as reinforcing fibers. A laminated fabric is a fabric having a layer of a polymer attached to one or two sides, which layer(s) may have been applied by heat- or adhesive-bonding a polymer film or sheet, and a coated fabric has a coating layer (e.g. of a polymer) on one or two sides or on a part thereof, which coating may have been applied as a solution, dispersion or melt, and which may have partially penetrated between and/or partially or fully covered fibers of the fabric.

A knit fabric is a fabric made from at least one strand that is interconnected by looping around itself; commercial knit fabrics are generally made on knitting machines applying multiple strands. A woven fabric is made from at least 2 strands, with a—warp-strand running along the length of the construct and another—weft or fill—strand substantially perpendicular thereto; with warp and weft strands interlacing (crossing over and under each other) in a certain weave pattern. Knitted and woven fabrics may be flat sheet-like or (hollow) tubular structures. A braided fibrous construct or fabric is made from at least 3 strands interlacing one another in a diagonally overlapping pattern; and is typically a flat, round or a tubular construct of relatively narrow width. Non-woven fabrics can be made from staple or continuous fibers bound together by chemical, mechanical, solvent and/or heat treatment(s); like a felt, or a spun-bound or needle-punched fiber web. The fibers may be randomly oriented such as in a felt but may also be substantially oriented in one (or more) directions. In the last case, and especially if bound together by laminating, coating or impregnating with a polymer, such construct may also be referred to as a unidirectional (UD) composite.

A biocompatible material is biologically compatible by not producing a toxic, injurious, or immunologic response when in contact with living tissue. Biodegradable means a material is susceptible to chemical degradation or decomposition into simpler components by biological means, such as by an enzymatic action. Biostable or bioinert means the material is substantially non-biodegradable under conditions and time of intended use.

By combining a selected knit fabric with a certain amount of the specific polyurethane the method enables making a composite sheet, which advantageously shows high flexibility and in at least two orthogonal directions and/or non-linear uniaxial tensile behavior characterized by its 1%-secant modulus, hardening transition point, tensile strength, and/or flexural rigidity per unit width. In an embodiment, the behavior is further characterized by a flexural modulus of from 10 to 200 MPa.

The composite sheet can form part of or form a medical implant component, meaning that the composite sheet can form a structural or strength providing part of such component, or the composite sheet is a medical implant component. Examples of other items that may form part of the implant component or form part of the medical implant include a metallic or polymeric stent frame, a skirt or cuff that may partly cover the stent, a suture that may connect the composite sheet to another item or component, or other fixation structures in case of a prosthetic heart valve. Such implant components may be covered with a temporary protective compound or film for packaging, or may be compressed and crimped in a capsule, all of which parts can be removed before using the implant component.

The knit fabric is provided as reinforcing fabric, which fabric is based on strands comprising biocompatible, polymer fibers. The fabric may be substantially isotropic or may show anisotropy. The skilled person has knowledge about various knitting techniques and about different characteristics of resulting fabrics; and will be able to select a suitable fabric type given a specific intended application of the composite sheet and its requirements, based on general knowledge, on disclosures in this description, and optionally assisted by some experiments.

In embodiments, the fabric is substantially flat, such as typically resulting from a standard machine knitting process. In other embodiments, the fabric has been made in a shaped form, like a tubular structure. An as-made fabric may also subsequently have been thermally shaped using a mold or mandrel.

Knitting is a technique for making a (two- or three-dimensional) fabric from a one-dimensional strand like a continuous yarn or from a set of strands, by forming a series of interlocking loops with each row of loops caught into the preceding row. Whereas in a woven fabric the strands run mostly straight and parallel lengthwise (warp strands) and crosswise (weft strands), strands in knit fabrics follow a meandering path (typically called a course) and form symmetric loops (also called stitches) above and below the mean path of the strand. In knitting, a wale is a column of loops running lengthwise, corresponding to the warp of woven fabric; and a course is a crosswise row of loops, corresponding to the weft. This meandering loop structure results in a fabric that can generally be stretched more easily, in different directions, and to a greater extent than woven fabrics.

There are two basic types of knitting; weft knitting and warp knitting. By weft knitting, fabrics with different patterns may be made, including plain, rib, purl, pattern, and double stitches. In weft knitting, the entire fabric may be produced from a single strand or yarn, by adding stitches to each wale in turn, moving across the fabric as in a raster scan. By contrast, in warp knitting, which includes tricot, raschel, and milanese knits, one strand is required for every wale of the fabric. Since a typical piece of knit fabric may have hundreds of wales, warp knitting is done by machine, whereas weft knitting may be done by both hand and machine. Tricot is characterized by fine, vertical wales on the surface and crosswise ribs on the back, and such fabric has good draping qualities. Raschel knits can have a lace-like, highly porous, open construction, including mesh and net constructions.

Knit fabrics can be produced in both flat and tubular form; weft knits are most often tubular; warp knits are usually flat. Knit fabrics may be described in terms of the number of courses and wales per unit length and the mass of fabric per unit area. Alternatively, dimensions and configuration of the single loop may be used, the repeating unit determining such fabric characteristics as area density, knitting quality, and weight. The length of strand knitted into a loop or stitch is termed the stitch length, and in a plain knitted structure this is related to the courses per inch (CPI), wales per inch (CPI), and stitch density.

Depending on its structure, loops of a knit fabric, even if secured, may become undone when a strand is pulled, called ripping out or unravelling; this may especially occur after a fabric has been cut to size. It is an advantage of the composite sheet as obtained with the present method having a continuous polyurethane matrix, that pieces may be cut from the composite sheet, for example by using a laser like an ultra-short pulse laser, which cut pieces have stable edges and show good fraying resistance and suture retention strength.

A further advantage of using a knit fabric as reinforcement, rather than locally applying reinforcing high-strength fibers in a polyurethane matrix, for making a composite sheet suitable for making e.g. leaflets for a prosthetic valve, is that the risk of 'cheesewiring' is reduced. Such cheesewire effect refers to high-strength fibers or filaments damaging or even cutting through the matrix upon the material being repeatedly flexed and tensioned. A fabric comprising interlaced strands as reinforcement may similarly result in enhanced suture retention strength, in cases wherein sutures are applied to attach pieces of the composite sheet together or to other items like a skirt or stent.

In embodiments, the knit fabric used in making the composite sheet comprises or has substantially been made from fibers with a titer of 2-50 dtex. The unit dtex (or decitex) is typically used in fiber industry, like the related US unit denier, and indicates the linear density of a fiber, strand, yarn or filament; with 1 dtex being 1 gram per 10.000 meter of fiber. The lower the titer, the lower the thickness of a fiber. A fabric made from thin strands will generally be thinner and more flexible or pliable than a fabric made from thick strands, although the type of strand and type of polymer in a fiber, as well as fabric type may also have some influence.

In embodiments of the invention, the strands have a titer of at most 50, 40, 30, 25, 20, or 15 dtex; and of at least 2, 3, 4, 5, 6, 8, 10, or 15 dtex. In embodiments, the strands have a titer of 2-50, 4-40, 5-35, or 6-30 dtex for a good balance between handleability, pliability, low profile, and strength of the fabric. The skilled person will be able to select strands of suitable titer depending on desired thickness and texture of the fabric.

The fabric may comprise strands of the same or different linear density. By using strands of different titer, thickness of the fabric may be varied in length and/or width direction to create local thickness or stiffness differences, or to create a certain texture, for example with a certain pattern. In embodiments, all strands of the fabric applied in making the composite sheet have substantially the same titer. In such case, and especially when the number of wale and course strands per length unit are also substantially the same, the fabric and the composite sheet containing such fabric may show similar properties in different directions; e.g. longitudinal (or 0°) direction and in orthogonal (or 90°) direction.

Typically, tensile properties in different directions of the fabric (and of the composite sheet) will be mainly determined by the polymer fibers in the fabric once strands have been straightened during initial elongation of the sheet, whereas initially tensile elongation will be strongly influenced by deformation of the fabric and extension of the polyurethane matrix. This means that the composite sheet made with such knit fabrics will show non-linear uni-axial tensile behavior, at least in two orthogonal directions, but depending on the structure of the fabric even in any direction for a balanced fabric.

In general, non-linear tensile behavior is typical for several types of natural soft tissue, such as of heart valve leaflets. In FIG. 1, taken from a publication by Hasan et al. (J. Biomechanics 47, p 1949-1963; or DOI: 10.1016/j.biomech.2013.09.023) such non-linear behavior is schematically represented in a stress-strain curve. Hasan refers to $E_H$ as representing the 'high elastic modulus' (hereinafter called hardening modulus), to $\varepsilon_0$ as the 'zero-stress extrapolated strain' (hereinafter referred to as hardening transition point), and to $\varepsilon_{tr}$ as the 'transition strain'. The stress-strain curve of soft tissue can be split in several phases, wherein (i) is the low stress-low strain linear elastic phase, (ii) the highly non-linear transition phase, (iii) a post-transition linear elastic region linked to elongation of oriented collagen fibers, and (iv) a non-linear phase of decreasing stress until rupture. In normal functioning of a heart, leaflets will typically be elongated about 10-15% during opening and closing of the valves; which is below said hardening transition. This is further illustrated in FIG. 2, which shows 3 stress-strain curves measured, under physiological conditions (e.g. in water at 37° C.), on test samples taken from a sheet of treated pericardium; also showing non-uniformity of that such natural tissue is generally non-uniform and shows some anisotropy. The hardening transition points observed for this pericardium material fall within 25-45% strain.

In embodiments, the knit fabric that is applied in the method is thin and pliable and has a relatively open, porous structure. Examples of such knit fabrics include so-called mesh fabrics, which can have relatively large openings of different forms. Mesh fabrics, or net-like fabrics, may have a basic square pattern, but openings may for example also have a diamond or a hexagonal shape. Mesh fabrics are typically made using raschel warp knitting machines.

In embodiments, the knit fabric is a mesh fabric, which comprises mesh openings of about 25-250 µm. In an embodiment, mesh openings are measured on a fabric laid flat and without force applied using a microscope. A fabric with relatively large openings will generally also have a low areal density and high flexibility, whereas strength properties may be better for fabrics with smaller apertures. In embodiments, the fabric comprises mesh openings of at least 25, 50, or 75 µm, and of at most 175, 150, or 125 µm.

In embodiments, the fabric has a thickness of about 15-225 µm. Thickness of the fabric is related to the titer of strands, to the type of knitting technique used in making the fabric and to the density of the fabric; e.g. the number of strands crossing over each other in loops, the distance between strands and size of openings between strands. In an embodiment, the fabric has a thickness of at most 175, 150, 125, or 100, 90, 80 or 75 µm and at least 15, 20, 25, 30, 35, 40 45, or 50 µm. The thickness of a fabric is the maximum thickness after measuring the thickness at multiple locations, as knit fabrics typically do not have a uniform thickness. For example, openings in a mesh knit fabric have a zero thickness. Reported values generally relate to loops wherein strands cross each other.

In an embodiment, the knit fabric comprises a plurality of openings such that the fabric comprises a thickness in a plurality of first locations, and pores in a plurality of second locations. In an embodiment, the thickness in a plurality of first locations corresponds to the crossing or stacking of one or more strands. In an embodiment, the crossing or stacking is of three strands or results in a thickness at least three times the thickness of one strand. In an embodiment, the first locations correspond to the interconnection of a loop of one or more strands with the same or a different strand. In an embodiment, the maximum thickness of the fabric is at one or more of the first locations.

After forming the composite sheet, the first locations of the composite sheet have a thickness equivalent to the thickness of the fabric and the thickness of the polyurethane coating, such as the diameter of 3 strands plus the thickness of the polyurethane coating. The pores have a thickness corresponding to the thickness of the polyurethane coating at the one or more second locations, which may be different that the thickness of the polyurethane coating at the one or more first locations.

In embodiments, the fabric has an areal density of 5-30 g/m$^2$. Areal density of the fabric is related to the type of strands, the type of knitting technique used in making the fabric and the density of the fabric. Areal density can be relatively low in view of thickness when compared to e.g. woven fabrics. In an embodiment, the fabric has an areal density of at most 26, 24, 22, 20, 19, 18, 17, 16 or 15 g/m$^2$ and at least 6, 7, 8, 9, or 10 g/m$^2$.

The fabric has strands comprising biocompatible polymer fibers, which strands may be present in different forms. For example, the strands may be present as a monofilament, as a typically twisted multifilament yarn, or as two or more yarns twisted or braided together as a cord. In embodiments, the fabric consists of strands of at least one multifilament yarn; to enable high flexibility and low thickness of the fabric and composite.

In embodiments, the knit fabric has strands that comprise at least 50 mass % of high-strength polymer fibers, and further other fibers or other strands that may have different characteristics; as long as the fabric conforms to the other features as described herein. In preferred embodiments, the fabric contains at least 60, 70, 80, 90, or 95 mass % of said high-strength polymer fibers, or is substantially made from or made from high-strength polymer fibers. In embodiments, the fabric consists of strands each of which consists of at least one, or of one high-strength polymer multifilament yarn.

The fibers in the fabric may be of various different structures and may be made from various biocompatible, and optionally biostable, synthetic polymers. In embodiments, the fibers are present as monofilaments or as multifilament yarns. In case of monofilaments, a strand in a fabric is preferably formed by one monofilament, typically with a titer of 2-50 dtex. If the monofilament is thicker, the stiffness of the fabric may be too high for the intended application. Preferably, a monofilament has a titer of at most 45, 40, 35 or 30 dtex.

In other embodiments, the fabric comprises or substantially consists of strands having at least one multi-filament yarn. In embodiments, the fabric substantially consists of strands having one multi-filament yarn, or in other words each strand is a single multifilament yarn. The multi-filament yarn can be twisted or non-twisted. Twisted yarns generally are easier to handle and convert into a fabric, whereas untwisted yarns may result in a more pliable fabric, as filaments may move and shift easier relative to one another and the cross-section of a yarn may have become more oblong or flattened in the fabric. In some embodiments, the fabric is made from strands that comprise non-twisted multi-filament yarn. Typically, individual filaments contained in a multi-filament yarn may have a titer per filament that varies widely; like from 0.2 to 10 dtex, or preferably said titer is at least 0.3 or 0.4 dtex per filament and at most 8, 6, 4 or 2 dtex per filament; and filaments can have a cross-section that is substantially round but also oblong or any other form.

In embodiments, the fabric comprises high-strength fibers with tenacity of at least 0.7, 0.8, 0.9 or 1.0 N/tex. There is no actual limit for fiber tenacity, but tenacity is generally at most 5 or 4 N/tex. Tenacity is commonly measured on a multi-filament yarn, but may also be determined on a single filament; suitable methods are described in the experimental part. Suitable fibers have generally been made from a thermoplastic polymer, of which chemical composition may vary widely. Biocompatible thermoplastic synthetic polymers that are used in fiber making include materials like poly(meth)acrylates, polyolefins, vinyl polymers, fluoropolymers, polyesters, polyamides, polysulfones, polyacrylics, polyacetals, polyimides, polycarbonates, and polyurethanes, including copolymers, compounds and blends thereof. Such synthetic polymers may also be based on natural compounds like amino acids and/or on synthetic monomers. In embodiments, the biocompatible fibers are based on polyolefins, polyketones, polyamides, or polyesters. Suitable polyolefins include polyethylenes and polypropylenes, especially such polymers of high molar mass like high molar mass polyethylene (HMWPE) and ultra-high molar mass polyethylene (UHMWPE). Suitable polyamides include aliphatic, semi-aromatic and aromatic polyamides, like polyamide 66 and poly(p-phenylene terephthalamide). Suitable polyesters include aliphatic, semi-aromatic and aromatic polyesters, like poly(l-lactic acid) (PLLA) and its copolymers, polyethylene terephthalate (PET) and liquid crystalline aromatic copolyesters. In embodiments, the fibers are made from PET or PLLA. Polymer fibers can be made using different fiber spinning processes as known in the art; like melt spinning and solution spinning, including special techniques like gel spinning or electrospinning.

In further embodiments, the fibers in the fabric of the composite sheet have been made from one or more polyolefins selected from homopolymers and copolymers, including e.g. bipolymers, terpolymers, etc., which contain one or more olefins such as ethylene and propylene as monomer units. Such polyolefins preferably have a high molar mass and may have been formed by any method known to those skilled in the art. A high molar mass is herein understood to mean a weight averaged molecular weight (or molar mass) of at least 350 kDa, as determined by GPC or as derived from solution viscosity measurements. Suitable examples of polyolefins include polypropylenes, polyethylenes, and their copolymers or blends; like polypropylene homopolymer, medium density polyethylene, linear or high-density polyethylene, copolymers of ethylene and relatively small amounts of one or more alpha-olefins such as butene-1, hexene-1, and octene-1, linear low-density polyethylene, ethylene/propylene copolymers, propylene/ethylene copolymers, polyisoprene and the like. Polypropylene and polyethylene polymers are preferred. An advantage of such high molar mass polyolefin fibers, in addition to their good biocompatibility and biostability, is the relatively high tensile strength such fibers (both at yarn and filament level) may have; that is a tenacity of at least 1.5 N/tex, which allows making thin yet strong and durable fabrics.

In further embodiments, the fabric comprises fibers made from a linear polyethylene such as a high molecular weight polyethylene (HMWPE) or an ultra-high molecular weight polyethylene (UHMWPE). The old term molecular weight is still interchangeably used in the art with molar mass; also reflected in the commonly used abbreviation for (ultra-)high molar mass polyethylene. UHMWPE is a synthetic polymer that shows good biocompatibility in combination with high biostability or bio-inertness, and which is used in various biomedical devices and implants for quite some time already. UHMWPE is herein understood to be a polyethylene having an intrinsic viscosity (IV) of at least 4 dL/g, like between 4 and 40 dL/g. Intrinsic viscosity is a measure for molar mass that can more easily be determined than actual molar mass parameters like Mn and Mw. IV is determined according to method ASTM D1601(2004) at 135° C. on solutions in decalin, the dissolution time being 16 hours, with butylhydroxytoluene as anti-oxidant in an amount of 2 g/L solution, by extrapolating the viscosity as measured at different concentrations to zero concentration. There are various empirical relations between IV and Mw, such relations typically being dependent on factors like molar mass distribution. Based on the equation Mw=$5.37*10^4$ $[IV]^{1.37}$ an IV of 8 dL/g would correspond to Mw of about 930 kDa, see EP0504954A1. In embodiments, the IV of the UHMWPE in the fibers is at least 5, 6, 7 or 8 dL/g and IV is at most 30, 25, 20, 18, 16 or at most 14 dL/g; to arrive at a balance between high mechanical properties and ease of processing. In general, the IV as measured on the UHMWPE polymer in a fiber or fabric can be somewhat lower than the IV of the polymer as used in making the fibers. During a fiber manufacturing process, like the gel-extrusion method described further on, the polyolefin may be subject to some thermal, mechanical and/or chemical degradation, which may result in chain breakage, lowering of the molar mass and/or a different molar mass distribution.

In further embodiments of the disclosure, the UHMWPE in the fibers may be a linear or slightly branched polymer, linear polyethylene being preferred. Linear polyethylene is herein understood to mean polyethylene with less than 1 side chain per 100 carbon atoms, and preferably with less than 1 side chain per 300 carbon atoms; a side chain or branch containing at least 10 carbon atoms. The linear polyethylene may further contain up to 5 mol % of one or more other alkenes that are copolymerizable with ethylene, e.g. $C_3$-$C_{12}$ alkenes like propene, 1-butene, 1-pentene, 4-methylpentene, 1-hexene and/or 1-octene. Side chains and comonomers in UHMWPE may suitably be measured by FTIR; for example on a 2 mm thick compression molded film, by quantifying the absorption at 1375 cm using a calibration curve based on NMR measurements (as in e.g. EP0269151).

The UHMWPE in the fibers may be a single polymer grade, but also a mixture of polyethylene grades that differ in e.g. molar mass (distribution), and/or type and amount of side chains or comonomer(s). The UHMWPE in the fibers may also be a blend with up to 25 mass % of another polyolefin as described above. Generally, the UHMWPE fibers are suitable for medical applications, containing only low amounts of customary and biocompatible additives and residual spin solvent. In embodiments, the fibers contain at most 5, 4, 3, 2 or 1 mass % of additives. In further embodiments the fibers contain at most 1000 ppm of spin solvent, preferably at most 500, 300, 200, 100 or 60 ppm.

In embodiments, the fabric comprises polymer UHMWPE fibers, such as a multi-filament yarn, having a tensile strength or tenacity of at least 1.5, 2.0, 2.5, 2.8, or 3.0 N/tex and typically of at most about 4.5, 4.0, 3.7 or 3.5 N/tex; and preferably have a tensile modulus of at least 30 and up to 150 N/tex. Tensile properties like strength (or tenacity) and modulus (or Young's modulus) of UHMWPE fibers are defined and determined at room temperature, i.e., about 20° C., for example on multifilament yarn based on ASTM D885M, using a nominal gauge length of the fibre of 500 mm, a crosshead speed of 50%/min and Instron 2714 clamps, of type "Fibre Grip D5618C". Based on the measured stress-strain curve the modulus is determined as the gradient between 0.3 and 1% strain. Alternatively, tensile properties may be measured on a single filament, applying a procedure as indicated in the experimental part. For calculation of the modulus and strength, the tensile forces measured are divided by the titer, as determined by weighing 10 metres of yarns; values in MPa may be calculated from N/tex assuming a density of 0.97 g/cm$^3$ for UHMWPE fibers.

In further embodiments, the fabric may comprise more than one type of high-strength fibers, or high-strength fibers and other fibers such as elastic fibers. Such different fibers may be present in some but not all strands. In embodiments of present disclosure, the knit fabric contains only strands of (substantially) the same composition. In other embodiments, the strands of the fabric applied for making a composite sheet substantially consists of or consists of one type of high-strength polymer fibers.

In an embodiment, the surface of the fabric is pretreated with a high-energy source to activate its surface. Such treatment especially aims to improve bonding of the strands and optionally fibers in the fabric to a polyurethane but may simultaneously also clean portions of the surface of the fabric. Many synthetic polymer fibers, especially polyolefin fibers, have a relatively non-polar and non-reactive surface, to which more polar polymers like some polyurethanes may show not sufficient adhesion to make a composite having high durability under continuously changing load conditions without providing such pretreatment. Such surface activation may be done by for example a plasma or a corona treatment, as are known in the art, and may introduce functional groups like oxygen-containing groups. Suitable examples of plasma surface treatments include cold plasma treatments, which can be performed at atmospheric or reduced pressure and at a temperature that does not negatively affect the polymer fibers of the fabric, for example such treatment with oxygen being present.

In an embodiment, the pretreatment step comprises atmospheric plasma activation or a corona treatment. In an embodiment, the pretreatment step is performed to activate substantially all surface of the fabric, to enhance adhesion of the fibers to the polyurethane. The skilled person will be able to assess whether a pre-treatment is needed and to which extent, depending on the polymer fiber and its interaction with the polyurethane to be used; possibly assisted by some experiments. The inventors observed that for example in case of a fabric made from a non-polar polymer like a polyolefin, the combination of a surface pretreatment and embedding the pre-treated fabric in a polyurethane having hydrophobic segments or optionally hydrophobic endgroups as matrix polymer, contributes to the favorable performance of the composite sheet made.

Subsequently, the fabric is embedded in a biocompatible and biostable polyurethane elastomer to form the composite sheet. This step may be performed in different ways, for example by laminating the fabric with one or more thermoplastic polyurethane films or by coating the fabric using a polyurethane composition like a solution of polyurethane. In general, the fabric, i.e. the strands and optionally fibers therein, is not specifically tensioned during such step, but the fabric may for example be mounted in a frame to prevent e.g. unwanted deformation like creasing. Similarly, the fabric may be mounted in a frame for the pre-treatment and coating.

In embodiments, the coating is created by a lamination technique; for example by making a stack of at least two thermoplastic polyurethane elastomer films and the fabric, with the fabric between polyurethane films, and compressing the stack, for example using a platen press and a mold, while heating at a temperature above the melting point (or softening point) of the polyurethane and below the melting point of the polymer fibers; such that the polyurethane substantially covers and encapsulates the strands, and optionally at least partly the fibers therein, of the fabric. The mold may be flat or have a certain shape, to result in a substantially flat or shaped composite sheet; and the surface of the mold may be smooth or have certain texture. As polyurethanes typically absorb moisture from the environment like up to several mass %, the polyurethane elastomer is preferably dried before laminating, optionally at elevated temperature and/or under an inert gas flow or under reduced pressure. For example, the polyurethane may be dried to a moisture level of less than 0.05 mass % to prevent hydrolytic degradation. Such drying process is known to a skilled person.

In other embodiments, the coating step is performed by using a coating technique to apply a polyurethane coating composition to the fabric; for example, by solution coating with a coating composition comprising the polyurethane elastomer, a solvent for the polyurethane, and optionally auxiliary compounds. The polyurethane elastomer component may be a thermoplastic polymer or a composition that forms a thermoset during or after the coating step; but the polyurethane elastomer is soluble in a suitable solvent. An advantage of solution coating vs melt laminating is that a polyurethane solution of relatively low viscosity can be used to impregnate and embed the fabric at a temperature well below the relaxation, softening or melting temperature of the polymer of the fibers in the fabric. Coating at low temperature prevents deterioration of fiber and/or fabric properties by heat-induced relaxation or partial melting; considering that the melting point of a polymer like a polyolefin may be below the melting point of a thermoplastic polyurethane elastomer (TPU). Use of a solution of a polyurethane elastomer like a TPU to embed the fabric also has the advantage that by choosing conditions and solution viscosity the amount of polyurethane and extent of fiber wetting and impregnation can be controlled.

In embodiments, the fabric is pre-wetted with the solvent used in the polyurethane coating composition, followed by coating with the polyurethane coating composition. Such pre-wetting with solvent is found to improve and to enable better control of wetting and impregnation of the fabric by the polyurethane.

The coating composition may be applied to one side of the fabric, or to both sides; depending, for example, on the viscosity of the coating composition and to which extent the composition would or should penetrate in and optionally through the fabric to coat the strands of fibers therein. In case the polyurethane coating composition is applied to only one side of the fabric, resulting surface properties of the side to which the solution has been applied may be different than of the opposite side. For example, the relative amount of polyurethane may differ to result in one side being smoother than the other more textured side. Such composite sheet with different surface textures may show different interactions with biological matter; for example the 'smooth' side may show good blood compatibility without causing clotting, whereas at the 'textured' side having a more rough surface, optionally with pores in a top layer, ingrowth of tissue may occur when used as e.g. a graft material. In embodiments, the polyurethane coating composition is applied to all surface area of both sides of the fabric. In other embodiments the composition is applied to all surface area of one side and optionally locally at selected parts of the surface of the opposite side of the fabric.

The coating composition applied in the present method comprises a solvent for the polyurethane elastomer. A suitable solvent for polyurethane can substantially, or preferably homogeneously dissolve the polyurethane; but the polymer of the fibers in the fabric is not soluble in the solvent, at least not under the conditions of performing the present coating/embedding step. The person skilled in the art will be able to select a suitable solvent for a given combination of polyurethane elastomer and polymer based on his general knowledge, optionally supported by some literature; for example based on solubility parameters of solvents and polymers, which are for example given in the "Polymer Handbook" by Brandrup and Immergut, Eds. The skilled person is also aware of effects of polymer molar mass on solubility. For a so-called good solvent for a polyurethane elastomer including a TPU, interactions between polymer chain and solvent molecules are energetically favorable, and difference between solubility parameters of polymer and solvent is small.

In embodiments of the method, the solvent may be tetrahydrofuran (THF), methyl-tetrahydrofuran (m-THF), dimethylformamide (DMF), dimethylacetamide (DMAc), dimethylsulfoxide (DMSO), dichloromethane, chloroform, hexafluoro isopropanol, dioxane, dioxolane, mixtures thereof, or mixtures thereof with other less good solvents (or co-solvents), provided such mixtures can dissolve the polyurethane. In view of removing the solvent after application from the fabric, a solvent having such volatility that solvent can be substantially removed by evaporation, optionally by heating to a temperature at least 10° C. below the melting point of the polymer and of the polyurethane, is preferred. In embodiments, THF, m-THF or DMAc is used as the solvent.

The concentration of polyurethane elastomer in the coating composition as applied in the solution coating step is not critical and will generally be in the range of 0.1-20 mass % of polyurethane in solution. It was observed in dip-coating experiments, however, that for good penetration of coating composition in voids or pores between strands or fibers of the fabric, i.e. to impregnate the fabric, a solution of relatively low viscosity is preferably used. On the other hand, the higher the polyurethane concentration the less solution needs to be applied for efficient embedding. In embodiments, the solution of elastomer may have a Brookfield viscosity of about 1-5000 mPa·s, or a viscosity of at least 5, 10, 25 or 50 mPa·s and at most 3000, 2000, 1000, or 500 mPa·s.

The coating composition may further contain one or more auxiliary compounds, like, antibiotics, pharmacological agents to inhibit graft (re-)stenosis (e.g., paclitaxel), thrombosis inhibiting substances (e.g., heparin, or similar naturally derived or synthesized anti-coagulating agents), other biologics and small molecules to illicit a desired biological response, or radiopacifying agents. Such optional auxiliary compounds preferably have been approved for the targeted application by regulatory bodies like FDA; and may typically be present in relatively small, effective amounts, such that their concentration in the composite sheet is effective for its purpose and within approved ranges, yet without unacceptably deteriorating other performance properties of the composite sheet.

In some embodiments, the coating composition further comprises a radiopaque compound as additive, typically at a relatively high amount like 15-50 mass % based on polyurethane; for effective visualization of the composite sheet with medical imaging techniques using x-rays or other radiation. In an embodiment, the radiopacifier comprises tantalum, gold, platinum, tungsten, iridium, platinum-tungsten, platinum-iridium, palladium, rhodium, barium sulfate, bismuth subcarbonate, bismuth oxychloride, bismuth trioxide, ionic or non-ionic contrasting agents such as diatrizoates, iodipamide, iohexyl, iopamidol, iothalamate, ioversol, ioxaglate, and metrizamide, or a combination thereof. In an embodiment, the radiopacifier comprises tantalum, gold, platinum, tungsten, or a mixture or alloy thereof. In an embodiment, the radiopacifier is present as particles dispersed in the coating composition, for example made by dispersing particles in a solution of polyurethane. In an embodiment, the radiopacifier particles have an average particle diameter of at least 1 nm, preferably at least 5, 10, 25, 50, 100, or 200 nm. In an embodiment, the radiopacifier particles have an average particle diameter of at most 3 μm, preferably at most 2, 1, 0.5, or 0.2 μm. Average particle diameter can be measured using photon correlation spectroscopy (PCS) in accordance with ISO13321:1996. In an embodiment, the radiopacifier is surface treated with an adhesion promoter to enhance adhesion to the polyurethane; like with a glycidyl methacrylate (GMA) modified random ethylene/acrylate copolymer, or a GMA and maleic anhydride (MA) modified random ethylene/acrylate copolymer. In an embodiment, the radiopacifier is present in the coating composition in an amount of at least 20, 25, 30, or 35 mass %; and of at most 50, 45 or 540 mass % as based on polyurethane.

Solution coating methods as such are well known to a skilled person. Coating to embed the fabric in polyurethane can be performed using various application techniques, like using a pipette or a syringe, dip-coating, spray coating, inkjet application, or screen-printing; or a continuous method like a roll-coating processes and the like in case of a fabric substrate on a roll. The skilled person can select the method most suitable for an actual situation and type of fabric, based on common knowledge and some routine testing. The coating composition may be applied in one step, but also in multiple steps applying e.g. smaller amounts, for example with certain time between steps to allow the solution to at least partially dry.

The step of embedding by coating also comprises removing the solvent from the coated fabric, preferably the solvent is substantially completely removed. A simple and preferred way is to evaporate the solvent (or solvent mixture). This may be performed at ambient conditions, but also by applying a reduced pressure and/or an elevated temperature to enhance efficiency. If an increased temperature is used, care should be taken to prevent deterioration of properties of the composite sheet, for example caused by partial melting and/or stress relaxations of the polymer fibers in the fabric. Preferably, the temperature applied remains well, for example at least 10° C., below the melting temperature of the polyurethane and of the polymer fibers. Optionally, or alternatively, a washing step can be applied to substantially remove the solvent. Washing can be done with a liquid comprising or consisting of a wash solvent that is a non-solvent for both the polyurethane and the polymer, but which is miscible with the solvent for the polyurethane. Such washing step can be performed at ambient temperature, but also at elevated temperature with similar constraints as indicated above. Solvent removal is typically performed to result in a residual solvent level of the composite sheet that is in accordance with specifications or regulations for use in a medical implant. In an embodiment, the composite sheet as obtained has a residual solvent content of less than 50 ppm; for example, after drying under nitrogen for 24 hours followed by drying in a convection oven at 50° C. for one hour.

The polyurethane elastomer used in the embedding step is a biocompatible and biostable polyurethane comprising polysiloxane segments, which forms a continuous matrix with embedded therein the fabric, meaning that the polyurethane substantially covers or encapsulates the strands of the fabric. The composite sheet in typically non-porous and non-permeable to aqueous compositions like bodily fluids like blood. As such, the composite sheet will be substantially water impermeable, meaning that the composite sheet is water impermeable at standard use conditions.

When the composite sheet is used as a component of an implantable medical device, the polyurethane, and not the embedded fabric or fibers, may contact bodily tissue or fluid. An implantable medical device is typically intended to function for a longer period, the polyurethane used is therefore biocompatible and biostable, meaning that it is not or only very slowly degraded under physiological conditions.

Polyurethane elastomers are typically block copolymers (also called segmented copolymers) and may be thermoplastics (typically linear or slightly branched polymers) or thermosets (crosslinkable or crosslinked oligomers or polymers). An elastomer is a polymeric material showing relatively low tensile (and flexural) modulus and better elastic recovery after elongation or deformation, when compared with other synthetic polymers, for example polymer from which the high-strength fibers are made. A thermoplastic elastomer can be repeatedly molten by heating and re-solidified by cooling; and derives its elasticity from reversible physical crosslinking instead of from chemical cross-links as in thermoset elastomers. The polyurethane elastomer component of the composite sheet may be thermoplastic or form a thermoset during or after forming the composite sheet; but the polyurethane elastomer used is soluble in a suitable solvent upon making the composite sheet.

Block copolymers are polymers comprising blocks (also called segments) of polymers (including oligomers) that are chemically distinct, and which show different thermal and mechanical properties, and different solubilities. Generally, the blocks in a block copolymer comprising two (or more) types of blocks are referred to as being 'hard' and 'soft' polymer blocks, such different blocks resulting in microphase separation of hard and soft blocks. The hard block in a block copolymer typically comprises a rigid or high modulus polymer, with a melting temperature ($T_m$) or a glass transition temperature ($T_g$) higher than the use temperature, of e.g. about 35° C. The soft block in the block copolymer often comprises a flexible, low modulus, amorphous polymer with a $T_g$ lower than 25° C., preferably lower than 0° C. As for most mechanical properties, thermal parameters like $T_m$ and $T_g$ are generally determined on dry samples; using well-known techniques like DSC or DMA. In such phase-separated block copolymers, the hard segments function as physical crosslinks for the flexible soft segments, resulting in materials having properties ranging from fairly stiff to flexible and elastic, depending on the ratio of hard to soft blocks. Depending on type and amount of hard blocks, the polyurethane may show good stability and elasticity over a desired temperature range without the need for chemical crosslinking; and can generally be processed as a thermoplastic.

In embodiments of present disclosure, the polyurethane elastomer is a thermoplastic. This has advantages as it allows making a composite by heat-bonding or laminating polyurethane granules or sheets with a fabric, but also by coating and impregnating a fabric with a solution of the polyurethane. In addition, a composite sheet may be formed into a desired shape using a mold or mandrel and certain heating and cooling steps.

In other embodiments, the polyurethane is a thermosetting composition, which may be processed to form a composite with a fabric during and/or after which the polyurethane is crosslinked, to stabilize the product and enhance for example mechanical properties like elasticity and fatigue resistance.

The term thermoplastic polyurethane elastomer (TPU) basically denotes a family of polymers with a substantially linear backbone comprising the reaction product of at least three principle components; that are a diisocyanate, a diol chain extender and a polymer diol (also called macroglycol). Optionally, a monofunctional compound may be used as a further component functioning as a chain stopper and forming endgroups. Endgroups may function to only stop reaction, but can also be functional groups; like non-polar or hydrophobic endgroups or hydrophilic endgroups. Such functional end-group modified polyurethanes may show enhanced interactions with other materials, like with fibers in a composite or with biological material as an implant component. In embodiments, the backbone of the polyurethane applied in present invention is linear and has one or an average of two endgroups.

In embodiments, the polyurethane elastomer comprises hard blocks that include urethane groups and optionally urea groups in repeating units, which have resulted from reaction of a diisocyanate with a diol and optionally a diamine as chain extender.

Suitable diisocyanates include aromatic, aliphatic and cycloaliphatic compounds, having an average of 1.9-2.1 isocyanate groups per molecule. In an embodiment, the diisocyanate comprises 4,4'-diphenylmethane diisocyanate (MDI), 2,4-toluene diisocyanate, 2,6-toluene diisocyanate (TDI), 1,4-phenylene diisocyanate, hexamethylene diisocyanate (HDI), tetramethylene-1,4-diisocyanate, cyclohexane-1,4-diisocyanate, dicyclohexylmethane-4,4'-diisocyanate (HMDI), isophorone diisocyanate (IPDI), or a mixture thereof. In an embodiment, the diisocyanate comprises hexamethylene diisocyanate, dicyclohexylmethane 4,4'-diisocyanate, isophorone diisocyanate, or a mixture thereof. In an embodiment, the diisocyanate consists of hexamethylene diisocyanate, dicyclohexylmethane 4,4'-diisocyanate, isophorone diisocyanate, or a mixture thereof.

In embodiments, the diisocyanate comprises 4,4'-diphenylmethane diisocyanate, 2,4-toluene diisocyanate, 2,6-toluene diisocyanate, or 1,4-phenylene diisocyanate. In other embodiments, the diisocyanate consists of 4,4'-diphenylmethane diisocyanate, 2,4-toluene diisocyanate, 2,6-toluene diisocyanate, 1,4-phenylene diisocyanate, or a mixture of two or more thereof. In an embodiment, the molar mass of the diisocyanate is from 100 to 500 g/mol. In an embodiment, the molar mass of the diisocyanate is from 150 to 260 g/mol.

Chain extenders are typically low molar mass aliphatic compounds, having two or more hydroxyl or amine groups. Bifunctional chain extenders result in linear, generally thermoplastic polymers, whereas multifunctional isocyanates and/or chain extenders would lead to branched or crosslinked products. In embodiments, the bifunctional chain extender has a molar mass of at least 60 g/mol, at least 70 g/mol, at least 80 g/mol, at least 90 g/mol, or at least 100 g/mol. In other embodiments, the chain extender has a molar mass of at most 500 g/mol, at most from 400 g/mol, at most 300 g/mol, at most 200 g/mol, or at most 150 g/mol. In embodiments, the chain extender comprises at least one of ethylene glycol, diethylene glycol, propylene glycol, dipropylene glycol, 1,3-propanediol, 1,4-butanediol, 1,5-pentanediol, 1,6-hexanediol, and 1,8-octanediol; and/or such corresponding diamines. Presence of urea groups resulting from reaction of isocyanate with amine groups, typically results in stronger molecular interactions; which may be an advantage depending on the application. In embodiments, the polyurethane elastomer comprises only diol chain extenders and shows thermoplastic behavior; that is the polyurethane elastomer is a thermoplastic polyurethane elastomer or TPU.

In other embodiments, the polyurethane elastomer comprises hard blocks having both urethane and urea linkages; such polymers sometimes also referred to as polyurethane urea elastomers. The advantage thereof is enhanced interaction between the hard blocks, allowing a higher content of soft blocks resulting in block copolymers, which show enhanced flexibility and elasticity, and excellent flex life or fatigue resistance. Depending on the ratio diol/diamine, the polyurethane elastomer may show such strong interaction that at a melt processing temperature thermal degradation may be such that solution processing is to be preferred for optimal performance. Commercially available examples of such polyurethane elastomers comprising both urethane and urea linkages include Biospan® products (available from e.g. DSM Biomedical BV, Sittard-Geleen NL).

In an embodiment, polyurethane elastomer comprises polysiloxane (also called silicone) segments, i.e. it contains soft blocks derived from a polysiloxane diol or polyol (or diamine). In embodiments, the polyurethane elastomer comprises segments derived from a polysiloxane diol or polyol and at least one aliphatic polymer diol or polyol chosen from the group consisting of polyethers, polyesters, polyacrylates, and polyolefins; which polymers are bifunctional with hydroxyl (or amine) terminal groups. The polymer diols for the soft blocks are understood herein to include oligomers, homopolymers and copolymers, and polyesters are considered to include polycarbonates. Generally known polyurethane block copolymers and methods to prepare these copolymers are described in a.o. U.S. Pat. Nos. 4,739,013, 4,810,749, 5,133,742 and 5,229,431.

In embodiments of the present disclosure the polyurethane elastomer comprises soft blocks derived from a polysiloxane diol and at least one polymer diol chosen from an aliphatic polyester diol, an aliphatic polyether diol, and a poly(isobutylene) diol. As for chain extenders, also amine-functional soft blocks can be used, resulting in additional urea linkages. Biocompatibility and biostability of such polyurethane block copolymers in the human body has been proven.

Mechanical and other properties of a polyurethane elastomer can be tailored by varying chemical compositions and/or molar mass of the blocks. The hard blocks of a polyurethane elastomer for use in the method of making a composite sheet may have a molar mass of about 160 to 10,000 Da, and more preferably of about 200 to 2,000 Da. The molar mass of the soft segments may be typically about 200 to 100,000 Da, and preferably at least about 400, 600, 800 or 1000 Da and at most about 10,000, 7500, 5000, 4000, 3000 or 2500 Da. Within the context of present disclosure, molar mass of polymers and oligomers discussed refers to the number average molar mass ($M_n$), as for example derived from GPC measurements or by determining amount of hydroxyl (or amine) endgroups. The ratio of soft to hard blocks can be chosen to result in certain stiffness or hardness of the polymer. Typically, hardness of the polyurethane as measured with the Shore durometer hardness test using A or D scales, may be from 40 ShA, or at least 50 or 60 ShA and up to 80, 75, 70, 65 or 60 ShD or up to 100, 90 or 85 ShA, generally representing a flexural modulus range of about 10 to 2000 MPa. In embodiments, the polyurethane elastomer has a hardness from 40 ShA to 60 ShD, preferably 40-100 ShA or 40-90 ShA.

In other embodiments of present disclosure, the polyurethane elastomer further comprises an aliphatic polyether or an aliphatic polyester as soft block, more specifically an aliphatic polycarbonate. Suitable aliphatic polyethers include poly(propylene oxide) diols, poly(tetramethylene oxide) diols, and their copolymers. Suitable aliphatic polyesters are generally made from at least one aliphatic dicarboxylic acid and at least one aliphatic diol, which components are preferably chosen such that an essentially amorphous oligomer or polymer is formed having a $T_g$ below 10, 0, or −10° C. Aliphatic polycarbonate diols are based on similar aliphatic diols as used for polyester diols, and can be synthesized via different routes as known in the art. Suitable examples include poly(hexamethylene carbonate) diols and poly(polytetrahydrofuran carbonate) diols. In an embodiment, the soft block is based on a poly(hexamethylene carbonate) diol, a poly(polytetrahydrofuran carbonate) diol, or a mixture thereof.

In embodiments, the polysiloxane soft block of the polyurethane is derived from a poly(dimethyl siloxane) diol. In further embodiments, the soft blocks of the polyurethane are derived from a polysiloxane diol such as a poly(dimethyl siloxane) diol, and an aliphatic polycarbonate diol or a poly(tetramethylene oxide) diol. In an embodiment, the soft blocks are based on a polysiloxane diol, and a polycarbonate diol, a poly(tetramethylene oxide) diol, or a mixture thereof. In an embodiment, the soft blocks comprise a poly(dimethyl siloxane) diol and one or more of an aliphatic polycarbonate diol and a poly(tetramethylene oxide) diol. In an embodiment, the soft blocks are based on a poly(dimethyl siloxane) diol and one or more of an aliphatic polycarbonate diol and a poly(tetramethylene oxide) diol.

In embodiments, the soft blocks of the polyurethane elastomer may further comprise a $C_2$-$C_{16}$ fluoroalkyl diol or $C_2$-$C_{16}$ fluoroalkyl ether diol. In an embodiment, the soft blocks in the polyurethane backbone comprise the residue of 1H,1H,4H,4H-Perfluoro-1,4-butanediol, 1H,1H,5H,5H-Perfluoro-1,5-pentanediol, 1H,1H,6H,6H-perfluoro-1,6-hexanediol, 1H,1H,8H,8H-Perfluoro-1,8-octanediol, 1H,1H,9H,9H-Perfluoro-1,9-nonanediol, 1H,1H,10H,10H-Perfluoro-1,10-decanediol, 1H,1H,12H,12H-Perfluoro-1,12-dodecanediol, 1H,1H,8H,8H-Perfluoro-3,6-dioxaoctan-1,8-diol, 1H,1H,11H,11H-Perfluoro-3,6,9-trioxaundecan-1,11-diol. fluorinated triethylene glycol, or fluorinated tetraethylene glycol.

In embodiments, the $C_2$-$C_{16}$ fluoroalkyl diol or $C_2$-$C_{16}$ fluoroalkyl ether diol has an $M_n$ of at least 150 g/mol, at least 250 g/mol, or at least 500 g/mol. In an embodiment, the fluoroalkyl diol or fluoroalkyl ether diol has a molar mass of at most 1500 g/mol, at most 1000 g/mol, or at most 850 g/mol. In an embodiment, the $C_2$-$C_{16}$ fluoroalkyl diol or $C_2$-$C_{16}$ fluoroalkyl ether diol is present in an amount of at least 1 mass %, at least 2 mass %, or at least 5 mass %, based on the total mass of the polyurethane. In an embodiment, the $C_2$-$C_{16}$ fluoroalkyl diol or $C_2$-$C_{16}$ fluoroalkyl ether diol is present in an amount of at most 15 mass %, at most 10 mass %, or at most 8 mass %, based on the total mass of the polyurethane elastomer.

In embodiments, the polyurethane elastomer further comprises one or more hydrophobic endgroups. An endgroup is a generally a non-reactive moiety present at a terminal end of a molecule. In an embodiment, the polyurethane elastomer is linear and comprises a hydropobic endgroup at one end or terminus, preferably at each terminus of the backbone; i.e. it has an average of about 2 endgroups. In an embodiment, the hydrophobic endgroup is a linear compound. In another embodiment, the hydrophobic endgroup is branched. An endgroup may have been formed by reaction of an isocyanate group during or after forming the polymer backbone with a co-reactive group on a monofunctional compound, also called chain stopper. For instance, a formulation for forming a polyurethane may comprise a diisocyanate, at least one polymeric diol, a chain extender, and a monofunctional alcohol or amine; like 1-octanol or octylamine to form a $C_8$ alkyl endgroup.

In embodiments, the hydrophobic endgroup comprises a $C_2$-$C_{20}$ alkyl, a $C_2$-$C_{16}$ fluoroalkyl, a $C_2$-$C_{16}$ fluoroalkyl ether, a hydrophobic poly(alkylene oxide) or a polysiloxane, including their respective copolymers. In an embodiment, the hydrophobic poly(alkylene oxide) is poly(propylene oxide), poly(tetramethylene oxide) or a copolymer thereof. In an embodiment, the hydrophobic endgroup is a polysiloxane, like a poly(dimethyl siloxane) or a copolymer thereof. This polysiloxane endgroup can also be considered a polysiloxane segment.

In other embodiments, the endgroup comprises $C_2$-$C_{20}$ alkyl, $C_2$-$C_{16}$ fluoroalkyl, $C_2$-$C_{16}$ fluoroalkyl ether, or a hydrophobic poly(alkylene oxide). Such endgroups may be formed with monofunctional alcohols, including carbinols, or amines of the foregoing. Such polyurethane elastomers having hydrophobic endgroups are found to positively affect properties of the polyurethane and its interaction with other materials, including other polymers like polyolefins and bodily tissue and fluid like blood.

In embodiments, the hydrophobic endgroup comprises $C_2$-$C_{16}$ fluoroalkyl or $C_2$-$C_{16}$ fluoroalkyl ether. Such endgroups may be formed with monofunctional alcohols or amines comprising $C_2$-$C_{16}$ fluoroalkyl or $C_2$-$C_{16}$ fluoroalkyl ether. In an embodiment, the endgroup is formed from 1H,1H-Perfluoro-3,6-dioxaheptan-1-ol, 1H,1H-Nonafluoro-1-pentanol, 1H,1H-Perfluoro-1-hexyl alcohol, 1H,1H-Perfluoro-3,6,9-trioxadecan-1-ol, 1H,1H-Perfluoro-1-heptyl alcohol, 1H,1H-Perfluoro-3,6-dioxadecan-1-ol, 1H,1H-Perfluoro-1-octyl alcohol, 1H,1H-Perfluoro-1-nonyl alcohol, 1H,1H-Perfluoro-3,6,9-trioxatridecan-1-ol, 1H,1H-Perfluoro-1-decyl alcohol, 1H,1H-Perfluoro-1-undecyl alcohol, 1H,1H-Perfluoro-1-lauryl alcohol, 1H,1H-Perfluoro-1-myristyl alcohol, or 1H,1H-Perfluoro-1-palmityl alcohol.

In an embodiment, the hydrophobic endgroup is monomeric and has a molar mass of 200 g/mol or more, 300 g/mol or more, or 500 g/mol or more; and of 1,000 g/mol or less or 800 g/mol or less. In another embodiment, the endgroup is polymeric and has a molar mass of 10,000 g/mol or less, 8,000 g/mol or less, 6,000 g/mol or less, or 4,000 g/mol or less. In an embodiment, the endgroup is polymeric and has a molar mass of 500 g/mol or more, 1,000 g/mol or more, or 2,000 g/mol or more.

In embodiments, the hydrophobic endgroup is present in an amount of at least 0.1 mass %, at least 0.2 mass %, at least 0.3 mass %, or at least 0.5 mass %, based on the total mass of the polyurethane. In an embodiment, the hydrophobic endgroup is present in an amount of at most 3 mass %, at most 2 mass % or at most 1 mass %, based on the total mass of the polyurethane. In an embodiment, the hydrophobic endgroup is present in an amount of at least 0.1 mass %, at least 0.2 mass %, at least 0.3 mass %, or at least 0.5 mass %; and in an amount of at most 3 mass %, at most 2 mass % or at most 1 mass %, based on the total mass of the polyurethane.

The hard blocks in the polyurethane are typically based on an aromatic diisocyanate like toluene diisocyanate (TDI) or methylenediphenyl diisocyanate (MDI), and a low molar mass aliphatic diol like 1,4-butanediol. Polyether and polycarbonate polyurethanes may be suitably used for biomedical applications, in view of their flexibility, strength, biostability, biocompatibility and wear resistance. Polyurethanes containing a combination of a polyether and a polysiloxane, or a polycarbonate and a polysiloxane in the soft blocks show a unique combination of properties and may advantageously be used as the polyurethane in the composite sheet. Commercially available examples of such polymers include Carbosil® TSPCU products (available from DSM Biomedical BV, Sittard-Geleen NL).

In further embodiments, the polyurethane may be a blend of two or more polymers, which differ in composition and/or molar mass and of which at least one polymer comprises polysiloxane segments.

In other embodiments the polyurethane may comprise one or more customary additives that are allowed for the targeted use of the composite sheet; in addition to e.g. catalyst residues. Examples of additives include stabilizers, antioxidants, processing aids, lubricants, surfactants, antistatic agents, colorants, and fillers. The additives may be present in the typically effective amounts as known in the art, such as 0.01-5 mass % based on the amount of the polyurethane, preferably 0.01-1 mass %. In another embodiment, the polyurethane substantially consists of polymer, and is substantially free of additives. In embodiments, the polyurethane does not contain catalyst residues.

In embodiments, the polyurethane may show at a temperature above its melting point a melt flow that is at least 10 times higher than the melt flow of the polymer at said temperature. The polyurethane may have a melting point that is higher than the melting point of the polymer of the fibers, for example a polyolefin that may melt in a range 130-190° C. Melting point of a polymer fiber will a.o. depend on crystallinity and amount of oriented crystals present; for example high-strength polyethylene fibers, like UHMWPE fibers, show multiple melting peaks in a range 130-155° C. Basically, this melt flow feature specifies that the melt viscosity of the polymer, e.g. polyethylene, is significantly higher than the melt viscosity of the polyurethane at a certain temperature above the melting points of polymer and of polyurethane, for example at a temperature that may be reached during a subsequent step like laser cutting of the composite sheet as obtained into smaller pieces. Such difference in melt viscosities may result in a partially molten fiber polymer showing substantially no melt flow whereas the molten polyurethane may flow into the fabric and/or around strands of the fabric to embed the strands. Melt flow is typically measured as melt flow rate (MFR; also called melt flow index, MFI) following ASTM D1238 standard and reported as the amount of polymer extruded during a fixed time (that is in g/10 min) from a certain opening under a certain weight and at a certain temperature as specified for different polymers in the standard. High molar mass polyolefins, like HMWPE, typically have such high melt viscosity that a high mass is used in this test (21.6 kg vs 2.16 kg for most polymers) to have a measurable result (e.g. 0.2-1 g/10 min at 190° C. and 21.6 kg). UHMWPE grades typically have such high viscosity that there is no measurable melt flow under such conditions. In embodiments, the polyurethane has at said temperature above its melting point, for example at 210-240° C., a melt flow rate that is at least 10, 20, 40, 60 or even 100 times the melt flow rate of the polymer, e.g. a polyolefin like a UHMWPE. In case of fibers made from a polymer that does not melt up to a temperature of 250° C. or higher, polyurethane may similarly flow around fibers during laminating to form a composite sheet or during laser cutting of a composite sheet. Laser cutting as such is considered to induce very local heating of fabric fibers and polyurethane matrix to such temperature that composite material degrades and evaporates by focused laser energy. Adjacent to the cut being formed, polyurethane may melt and flow around cut fiber ends to form a straight, stable cut edge. This way the composite may be suitably cut into smaller pieces of desired shape using a laser, to make medical implant components.

In embodiments, the polyurethane amount in the composite sheet is at least 30, 35, 40, 45, 50, 55, 60, 65, 70, 75, or 80 mass % (based on total mass of the composite sheet). In general, a higher relative amount will result in a more elastic composite sheet, also depending on the fabric structure and type of fibers contained therein. A higher relative amount of fabric in the composite sheet may result in a stronger composite, showing strain hardening at lower strain, and in a lower areal density. In embodiments, the polyurethane amount is at most 85, 80, 80, 75, 70, 65, or 60 mass %. In other embodiments, the polyurethane amount is about 35-90 or 45-90 mass %.

The composite sheet of the disclosure comprises 30-90 mass % of a biocompatible and biostable polyurethane elastomer comprising polysiloxane segments, and a knit fabric comprising biocompatible, high-strength polymer fibers. The composite sheet may further comprise one or more auxiliary components; like one or more compounds selected from antibiotics; pharmacological agents to inhibit graft (re-)stenosis (e.g. paclitaxel); thrombosis inhibiting substances, which may chemically or otherwise link to a surface (e.g. heparin, or similar naturally derived or synthesized anti-coagulating agents); other biologics and small molecules to illicit a desired biological response; and radiopacifying agents. Such optional auxiliary compounds preferably have been approved for the targeted application by regulatory bodies like FDA; and may typically be present in relatively small, effective amounts, such that their concentration in the composite sheet is effective for its purpose and within approved ranges, yet without unacceptably deteriorating other performance properties of the composite sheet. Typically, said compounds are present up to a level of about 5 or 2 mass %; except in case of a radiopacifying compound, of which a higher relative amount is needed for effectively enhancing medical imaging contrast.

In embodiments, the amount of polyurethane is such that the strands are embedded in a continuous matrix of polyurethane. In case of an open fabric like a mesh fabric, the polyurethane matrix also forms a continuous film closing the mesh openings, to result in a composite sheet that is substantially non-porous. The local thickness of such 'non-reinforced' polyurethane film parts, corresponding to the pores, will generally be less than that of the coated or embedded strands. The composite sheet will thus not have an even thickness but may show 'hills and valleys' with certain surface roughness. In embodiments, the amount of polyurethane is such that the composite sheet contains at least 35, 40, 45, 50, 55, 60, 65, 70, 75, or 80 mass % (based on total mass of the composite sheet) of the polyurethane.

In an embodiment, the composite sheet comprises a first roughness that corresponds to the differences in thickness of the composite sheet between the plurality of first locations, corresponding to the portions of the fabric where strands cross, and the plurality of second locations, corresponding to the portions of the fabric comprising pores. The roughness may be the same on both sides of the composite sheet or present on only one side, or a first side of the sheet may have a greater roughness than a second side. In an embodiment, the thickness of the composite sheet at the one or more first locations is substantially equivalent to the thickness of the composite sheet at the one or more second locations as characterized by having an arithmetic mean height of the surface (Sa) of both sides of the composite sheet of from 2 to 12 μm and the maximum height of the surface (Sz) of both sides of the composite sheet of from 2 to 100 μm. The surface can be characterized according to ISO25178 using a 3D laser scanning confocal microscope.

In an embodiment, the roughness of the composite sheet is characterized by the combination of arithmetic mean height of the surface (Sa) of the composite sheet and the maximum height of the surface (Sz) of the composite sheet. In an embodiment, the arithmetic mean height of the surface (Sa) is 10 μm or more and the maximum height of the surface (Sz) is 100 μm or more. In an embodiment, the arithmetic mean height of the surface (Sa) is 10, 11, 12, 13 or 14 μm or more. In an embodiment, the arithmetic mean height of the surface (Sa) is from 10 μm to 30, 29, 28, 27, 26, 25, 24, 23, 22, 21, 20, 19, or 18 μm. In an embodiment, the maximum height of the surface (Sz) is 100, 105, or 110 μm or more. In an embodiment, the maximum height of the surface (Sz) is from 100 μm to 300, 290. 280, 270, 260, 250, 240, 230, or 220 μm. In an embodiment, such Sa and Sz are present on only one side of the composite sheet. In an embodiment, such Sa and Sz are present on both side of the composite sheet.

In embodiments, the composite sheet has a tensile strength in any direction of at least 10, 12, 14, 16, 18 or 20 MPa. There is no specific limitation to tensile strength, but in embodiments the tensile strength is at most about 60 or 50 MPa.

A benefit of the knit fabric relative to for example woven or other fabrics is that the properties of the resulting composite sheet may be more direction independent that other fabrics or reinforcements mechanisms. In embodiments, the direction independent properties of the sheet are characterized by performing measurements in each of two orthogonal directions and the diagonal thereof, for instance 0°, 90°, and 45°.

In an embodiment, the composite sheet has a 1% secant modulus of from 1 to 100 MPa in each of two orthogonal directions and the diagonal thereof, or in all directions. In an embodiment, the composite sheet has a 1% secant modulus of from 1, 2, 3, 4, or 5 to 100, 90, 80, 75, 70, or 65 MPa in each of two orthogonal directions and the diagonal thereof, or in all directions. In an embodiment, the composite sheet has a hardening transition point of from 5 to 75% in each of two orthogonal directions and the diagonal thereof, or in all directions.

In an embodiment, the composite sheet has a flexural rigidity per unit width of from 1 to 20 N·μm in each of two orthogonal directions and the diagonal thereof, or in all directions. In an embodiment, the composite sheet has a flexural rigidity per unit width of from 1, 2, 3, 4, 5, 6, 7, 8, 9, or 10 N·μm to 20, 19, 18, 17, 16, 15, 14, 13, 12, or 11 N·μm in each of two orthogonal directions and the diagonal thereof, or in all directions.

In an embodiment, the composite sheet has a flexural modulus of from 10 to 200 MPa in each of two orthogonal directions and the diagonal thereof, or in all directions. In an embodiment, the composite sheet has a flexural modulus of from 10, 15, 20, 25, or 30 MPa to 200, 190, 180, 170, 160, 150, 140, 130, 120, 110,100, 90, 80, 70, 60, or 50 MPa in each of two orthogonal directions and the diagonal thereof, or in all directions.

The composite sheet is biostable and biocompatible and may show excellent hemocompatibility. In a co-pending application, which meanwhile has been published as WO2020/178228A1, results of hemocompatibility testing, using a Chandler Blood Loop in vitro model and human blood, demonstrated that polyurethane-coated UHMWPE wovens, based on similar raw materials as disclosed herein, show superior hemocompatibility over a PET fabric that is frequently used in blood contact applications like stent-grafts.

A further advantage of the composite sheet of the present disclosure is that a sheet may be cut into a plurality of pieces using different methods like a blade, scissors or a laser, to result in pieces with stable cut edges. In embodiments, pieces of composite sheet that have been cut using a pulsed laser, like an ultra-short pulse laser are provided, which pieces have well-defined stable cut edges, with high fraying resistance and suture retention strength.

Further aspects of the disclosure concern the use of the composite sheet of the disclosure, including all the variations and options as described for the composite sheet in embodiments herein above and in any possible combination unless indicated otherwise or physically not feasible, in making a medical implant component suitable for an implantable medical device and the use of such medical implant component in making an implantable medical device. In embodiments thereof, said uses concern (a method of) making one or more leaflets for a prosthetic heart valve, and making a prosthetic heart valve comprising one or more of such leaflets.

In embodiments, a method of making a medical implant component from the composite sheet comprises a step of cutting pieces of a desired shape from the sheet. Such cutting may be done by known methods, like by using a blade, scissors, or by laser cutting.

In embodiments, making a medical implant component from the composite sheet comprises cutting one or more pieces by using a laser, which allows making a piece of material of complex shapes while having a stabile cut edge showing good fraying resistance and suture retention strength. A suitable laser for such purpose is selected and applied with such settings that enough energy is provided at the location to make cut through the composite sheet, whereby optionally a local cutting temperature may be reached that is above the melting point of the polyurethane such that the polyurethane locally may form a melt that flows to connect cut fiber ends with each other and/or with other fibers in the composite sheet. The laser cut itself is likely resulting from very localized heating of polyurethane and fibers to such temperature that material rapidly degrades and evaporates by the focused laser energy. To such effect, laser settings are selected such that no excessive heating occurs, to prevent forming of an irregular and deformed or disrupted edge zone adjacent to the cut in the composite sheet. An overheated edge may also show undesirable stiffening at the edge zone, deteriorating pliability of the sheet. The skilled person will be able to select a laser suitable for said purpose, like a $CO_2$, Nd or Nd-YAG laser, and to select proper settings including controlling the energy of the beam by e.g. pulsing. Generally, a $CO_2$ laser can be suitably used for cutting the composite sheet. It has been observed, however, that when using a continuous wave laser excessive heat-transfer in the composite sheet may occur, thereby distorting the cut edge or causing partial melting or shrinkage of the polymer fibers, and therewith of the sheet, due to e.g. thermal relaxation effects.

In embodiments of the disclosure, a pulsed laser is applied for cutting pieces from the composite sheet; that is a laser that emits light not in a continuous mode, but rather in the form of optical pulses. Therefore, in embodiments short pulse or ultra-short pulse (USP) lasers, like nano-, pico-, or femtosecond pulsed lasers, are applied; as they do not excessively heat the composite sheet which could cause morphological distortion, while the polyurethane may still melt to secure the cut edge. In exemplary embodiments, especially wherein the composite sheet contains polyolefin fibers like UHMWPE fibers, a cut is made with an USP laser applying an energy level setting of about 10-26 W, preferably of 12-24 or 14-22 W. In further embodiments, a cut is made applying a cutting speed of 1-12 mm/s, preferably 2-10 or 3-8 mm/s. More than one scan with an USP laser may be needed to cut completely through the composite sheet, o.a. depending on its thickness. In order to prevent damage to the composite sheet and resulting medical implant component, multi-step cutting may be preferred vs using higher energy settings.

In other aspects, uses of the composite sheet of present disclosure, or of pieces cut therefrom, include applications wherein the composite sheet will be in contact with body tissue and/or body fluids, such as in orthopedic applications including tissue reinforcement materials or in cardiovascular applications. Examples of materials for soft tissue reinforcement include meshes for hernia repair and abdominal wall reconstruction. Cardiovascular applications include devices and implants, like vascular grafts, stent covers, occlusion devices, artificial arteries, surgical meshes, valves like venous or heart valves, and introducer sheaths used in e.g. transcatheter procedures. The composite sheet may be applied as a component of said devices such that the direction or axis wherein the sheet has certain non-linear tensile properties is oriented in line with the direction in use wherein elastic extension and retraction is desired under applied stresses. In many of such applications the implant component needs to be connected or attached to other parts of a device or to surrounding soft or bone tissue. It is a further advantage of the present composite sheet that various techniques may be applied to make such connections. Suturing, for example, to attach pieces of composite sheet together and/or to a stent, like three pieces forming an assembly of leaflets in a support frame may be performed with reduced risk of the suture cutting through the material when tensioned. The composite sheet may in addition also connected by gluing; wherein the polyurethane matrix itself can at least partly act as a thermoplastic glue that can be activated by local heating, as by a laser.

Other aspects of the disclosure include such medical devices or implants as indicated above, which comprise said composite sheet or said medical implant component. Such medical devices include aortic grafts for abdominal or thoracic aortic aneurysm, venous valves for venous insufficiency, total artificial heart devices, ventricular assist devices, peripheral stent grafts, ateriovenous (AV) grafts, cardiac or vascular patch materials for surgical use, hernia meshes, surgical barrier materials, and other general cardiothoracic applications.

The experiments and samples below further elucidate embodiments of the invention, but of course, should not be construed as in any way limiting the scope of the claims.

EXAMPLES

Materials

The following raschel warp knit fabrics based on a single medical grade, low-denier UHMWPE multi-filament yarn (Dyneema Purity® TG 25 dtex, available from DSM Biomedical BV, Sittard-Geleen NL) for each strand were applied as reinforcement of composite sheets:

Examples 1 and 2—knit fabric (WPI 44, CPI 85) with mesh openings of about 91 µm, flat width of about 14.2 cm and (max.) thickness of about 156 µm;

Example 3—knit fabric (WPI 82, CPI 63) with mesh openings of about 72 µm, flat width of about 7.3 cm and (max.) thickness of about 210 µm; and Example 4—knit fabric (WPI 60, CPI 77) with mesh openings of about 120 µm, flat width of about 10.1 cm and (max.) thickness of about 212 µm.

Figure 3:
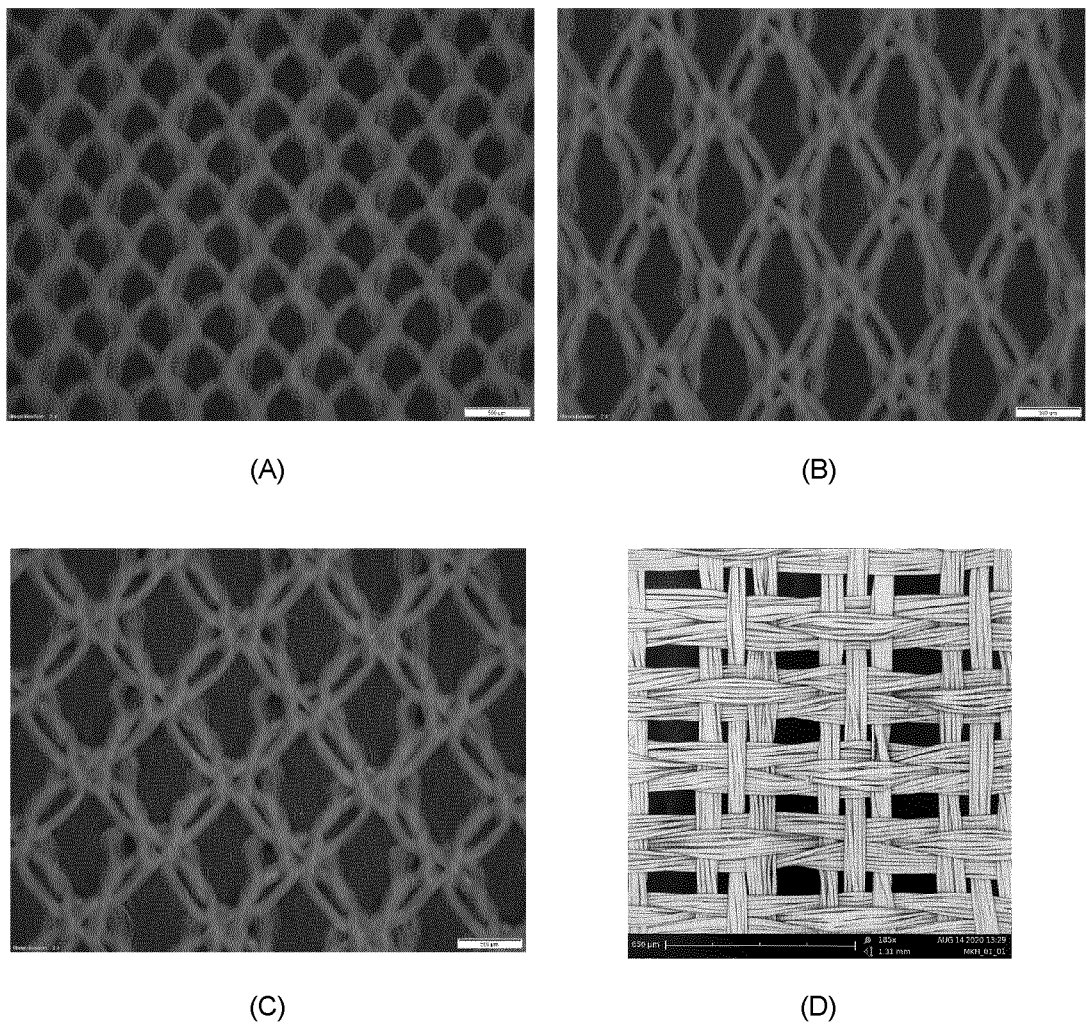
FIGS. 3(A)-3(D) present micrographs of fabrics used in experiments Ex 1 (A), Ex 3 (B), Ex 4 (C), and CE 3 (D).

In FIGS. 3(A)-(C) the structures of these three fabrics are shown in optical micrographs.

As comparative examples, the following polyolefin woven fabrics, made from a medical grade, low-denier UHMWPE multi-filament yarn as warp and weft strands (Dyneema Purity® TG 10 dtex; available from DSM Biomedical BV, Sittard-Geleen NL), were used as reinforcing material:

Comparative Example 1—woven fabric with 2*2 twill weave pattern, of 45 mm flat width and thickness of about 70 µm;

Comparative Example 2—woven fabric with plain weave pattern, of 45 mm flat width and thickness of about 62 µm;

Comparative Example 3—woven fabric with mock leno weave pattern, of 45 mm flat width and thickness of about 79 µm. A micrograph of this fabric is shown in FIG. 3(D).

As Comparative Example 4, the reinforcing material is a low profile commercially available polyester woven fabric (Secant Group, PA, USA) comprising polyethylene terephthalate (PET) multi-filament yarns of about 23 decitex as warp and weft strands. This fabric has a plain weave pattern and approximate thickness of 72 µm.

The reinforcing material in Comparative Example 5 is a biaxially-stretched, microporous UHMWPE film, Solupor® 7P03A (obtained from Lydall Performance Materials, Heerlen, NL). This membrane is indicated to have thickness of 50 µm, porosity of 86% and mean flow pore size of 0.3 µm.

For each of Examples 1-4 and Comparative Examples 1-5, the coating polyurethane is CarboSil® TSPCU 20-80A, available from DSM Biomedical BV, Sittard-Geleen, NL; a thermoplastic silicone polycarbonate polyurethane elastomer, having silicone endgroups, hardness 80 ShA, and MFR 52 g/10 min (1.20 kg/224° C.).

Comparative Example 6 is a treated (cleaned, devitalized and glutaraldehyde-crosslinked) porcine pericardium material was used as reference material.

Comparative Example 7 is a sheet of the same coating polyurethane (CarboSil® TSPCU 20-80A) without reinforcement.

Composite Preparation

Composites (Examples 1-4 and Comparative Examples 1-5) are made by first preparing a polyurethane solution and then dip-coating. Polyurethane solutions were prepared by dissolving CarboSil® TSPCU 20-80A in THF (Lichrosolve). Polyurethane pellets were first dried at 70° C. for up to 72 h. to remove moisture before solution preparation. Polyurethane concentrations ranging from 8-12 mass % were dissolved in THF by stirring overnight at room temperature.

Solution viscosity at 25° C. was determined with a Brookfield DV-E viscometer with UL-adaptor and ULA-49EAY spindle, which is calibrated using silicone-based viscosity standards (Benelux Scientific). Viscosities used in the experiments ranged from 180-500 mPa·s.

The fabrics were dip-coated in the polyurethane solution as followed. First, fabric samples of about 10-25 cm length were cut from the continuous UHMWPE fabrics (or membrane); and mounted in a frame as sample holder. The fabrics were cleaned by spraying and wiping the sample using heptane and dried at ambient temperature. Fabric samples cut from woven PET were similarly prepared and cleaned. Framed samples were pretreated by plasma activation during 60 s in a 15% oxygen atmosphere at 200 mTorr and 450 W. Mesh samples were pre-wetted by immersing in THF for 10 seconds, and then dip-coating was performed at ambient conditions by submersing a framed sample in a polyurethane solution and removing the sample with take-up speed between 0.1 and 0.6 cm/sec depending on desired coating thickness and to achieve film formation across all of the pores of the textile; followed by drying at 40° C. for 20 minutes.

Sheet Thickness

Maximum thickness of a fabric or composite sheet was measured using a Helios Preisser Electronic Outside Micrometer, with measuring range 0-25 mm (±0.001 mm).

Tensile Properties

Porcine pericardium, crosslinked in glutaraldehyde solution, and polyurethane were tested following ISO527-2 and using a test sample geometry 1BB according to the standard. For composite sheets with fibers embedded in matrix material, test sample specimens were cut with dimensions of 20 mm gauge length and 5 mm gauge width. Test samples were cut from the materials at 0, 45, and 90 degrees angle (relative to wale/warp direction in case of knit/woven fabrics, respectively, and to machine direction for the film of Comparative Example 5). Displacement rate for ISO527-2 and straight edged test samples was 25 mm/min and 41.5 mm/min, respectively; with samples being pre-loaded with 0.05 N prior to starting the test. All tensile testing was performed in a water bath at 37° C., with all samples except porcine pericardium conditioned in water at 37° C. for a minimum of 1 h prior to testing. Porcine pericardium was conditioned for 1 h prior to testing in phosphate buffered saline (pH 7.4). Strain was determined via machine displacement as optical tracking was not available for under water measurements.

The 1% secant modulus is calculated from the measured stress at 1% strain. The hardening modulus is determined from a linear fit between strain at 50% and at 55% of maximum stress (see for example FIG. 2). The hardening transition point is determined as the 0 stress extrapolated strain; i.e. by extending the hardening slope to cross 0 stress; which is taken as a reproducible indicator of strain hardening occurring. The obtained value may be negative, if the initial secant modulus is much higher than the hardening modulus.

Flexural Rigidity

Flexural measurements were performed by bending sample material with a custom fixture within an Ares 2 rheometer, as described by Sachs and Akkerman (DOI: 10.1016/j.compositesa.2017.05.032). Especially for thin composite plies, the fixture applies a constant rotational speed to perfectly bend the material, measuring the applied moment as a function of rotation angle. A setup as indicated in FIG. 1F of Sachs was used. Between the sample and the fixture, a PTFE spacer was utilized to reduce friction. The thickness of the spacer was optimized per sample to minimize the gap between the fixture and the sample. Sample dimensions were 25 mm width by 35 mm length. Of the 35 mm, 10 mm of each end of the sample was placed within the fixture, providing an initial gauge length of 15 mm for bending. The applied moment, M, is directly related to flexural rigidity (EI), by the known curvature, $\kappa$, that was applied via the custom fixture. Flexural rigidity is defined as the flexural modulus (E) multiplied by the $2^{nd}$ moment of area (I) about which bending occurred; that is $M/\kappa=EI$.

All measurements were performed at ambient room temperature conditions at a rotation rate of 1 rpm between 0° to 70° angle of rotation. Following bending, the sample was then unbent, and the test repeated 4 times. To provide flexural rigidity, the slope of applied moment vs curvature was averaged in the linear regime, after run in effects, between 20° and 40°. For each material 2 different samples were measured, and an average taken from all results to provide a flexural rigidity. Values reported are expressed per unit width for comparison of different materials.

Surface Roughness

Surface roughness was measured with a non-contact 3D profiler, the VR 3200 from Keyence. A surface area of approximately 2.7 $mm^2$ was analyzed in accordance with ISO25178 to provide the arithmetic mean height of the surface (Sa) and the maximum height of the surface (Sz). The maximum height may represent for examples areas of strands crossing over each other in a fabric.

Suture Pull-Out Force

Suture retention strength or suture pull-out force was measured on pieces of sheet of about 30*10 mm, through which a high-strength suture (FiberWire® 4.0) was inserted with a low-profile tapered needle in the center of the fabric and 2 mm from the edge of the short side. A Zwick Universal testing machine is used, equipped with a pneumatic Instron Grip (7 bar) and a Grip G13B, between which the looped suture and other end of the fabric are mounted with 50 mm grip-to-grip distance and preload of 0.05 N. The suture is then tensioned at test speed of 50 mm/min until failure of the sample. Suture retention strength is reported as the yield point of the measured pull out stress-strain curve (average value for 3 measurements), that is the force needed to pull the looped suture through the edge zone of the fabric.

Results

Three samples where possible, but at minimum two, were made for each Example and Comparative Example and the reported results are the averages across all samples. In Table 1 details the compositions of nine composite sheets, as detailed previously. Table 2 presents the results of the eight composite sheets, a pericardium sheet (Comparative Example 6), and an unreinforced polyurethane sheet (Comparative Example 7), as described previously.

TABLE 1

Sample compositions

| Exp. | Type | Reinforcement Areal density of mesh (g/m²) | Number of wale or warp strands (WPI or EPI) | Number of course or weft strands (CPI or PPI) | Composite sheet Areal density of sheet (g/m²) | Thickness (μm) | Amount of polyurethane (mass %) |
|---|---|---|---|---|---|---|---|
| Ex 1 | Mesh-like raschel knit; based on 25 dtex UHWMPE yarn | 21 | 44 | 85 | 50 | 161 | 59.0 |
| Ex 2 | Mesh-like raschel knit; based on 25 dtex UHWMPE yarn | 21 | 44 | 85 | 54 | 169 | 62.0 |
| Ex 3 | Mesh-like raschel knit; based on 25 dtex UHWMPE yarn | 24 | 82 | 63 | — | 201 | — |
| Ex 4 | Mesh-like raschel knit; based on 25 dtex UHWMPE yarn | 27 | 60 | 77 | 57 | 197 | 53.3 |
| CE 1 | 2 × 2 twill weave; based on 10 dtex UHWMPE yarn | 30 | 465 | 221 | 35 | 80 | 35.0 |
| CE 2 | plain weave; based on 10 dtex UHWMPE yarn | 18 | 117 | 161 | 46 | 75 | 55.8 |
| CE 3 | mock leno weave; based on 10 dtex UHWMPE yarn | 20 | 181 | 303 | 44 | 87 | 54.5 |
| CE 4 | plain weave; based on 23 dtex PET yarn | 44 | 300 | 154 | 70 | 86 | 37.8 |
| CE 5 | microporous UHMWPE film; | 7 | — | — | 26 | 55.6 | 73.4 |

TABLE 2

Sample Properties

| Property | Ex 1 | Ex 2 | Ex 3 | Ex 4 | CE 1 | CE 2 | CE 3 | CE 4 | CE 5 | CE 6 | CE 7 |
|---|---|---|---|---|---|---|---|---|---|---|---|
| 1% Secant modulus (MPa) | | | | | | | | | | | |
| @ 0° | 26 | 34 | 15 | 12 | 1509 | 2551 | 329 | 1017 | 276 | | 2.7 |
| @ 90° | 10 | 18 | 6 | 5 | 381 | 277 | 391 | 550 | 249 | | 2.3 |
| @ 45° | 32 | 62 | 25 | 19 | 106 | 58.1 | 38.4 | 150 | 392 | 25.9 | 3.1 |
| Hardening modulus (MPa) | | | | | | | | | | | |
| @ 0° | 121 | 87 | 78 | 97 | 4698 | 6491 | 3528 | 340 | 149 | | 44.2 |
| @ 90° | 21 | 38 | 54 | 24 | 4027 | 1860 | 2288 | 244 | 166 | | 38.1 |
| @ 45° | 9 | 29 | 31 | 34 | 625 | 397 | 206 | 109 | 183 | 6.7 | 62.8 |
| Hardening transition point (%) | | | | | | | | | | | |
| @ 0° | 25 | 17 | 21 | 25 | 2.4 | 1.0 | 2.1 | −2.3 | −5.0 | | 31.1 |
| @ 90° | 42 | 45 | 70 | 63 | 5.0 | 5.8 | 4.2 | 1.1 | −2.9 | | 34.3 |
| @ 45° | 39 | 7 | 18 | 17 | 30.8 | 31.0 | 36.0 | 17.2 | −5.1 | 183 | 30.2 |
| Tensile strength (MPa) | | | | | | | | | | | |
| @ 0° | 26 | 24 | 18 | 21 | 375 | 289 | 167 | 112 | 66.6 | | 8.7 |
| @ 90° | 29 | 21 | 15 | 15 | 221 | 134 | 142 | 65.7 | 39.7 | | 10.7 |
| @ 45° | 19 | 20 | 16 | 17 | 134 | 83.8 | 42.3 | 57.5 | 54.6 | 31.1 | 7.1 |
| Strain at maximum force (%) | | | | | | | | | | | |
| @ 0° | 49 | 45 | 45 | 50 | 11.5 | 5.9 | 7.6 | 41.4 | 51.9 | | 50.5 |
| @ 90° | 120 | 98 | 113 | 129 | 10.7 | 12.9 | 11.0 | 45.9 | 36.4 | | 52.3 |
| @ 45° | 90 | 74 | 68 | 70 | 54.1 | 52.5 | 60.2 | 85.8 | 41.2 | 591 | 47.4 |

TABLE 2-continued

Sample Properties

| Property | Ex 1 | Ex 2 | Ex 3 | Ex 4 | CE 1 | CE 2 | CE 3 | CE 4 | CE 5 | CE 6 | CE 7 |
|---|---|---|---|---|---|---|---|---|---|---|---|
| Flex. rigidity/unit width (N · μm) | | | | | | | | | | | |
| @ 0° | 11 | | | 22 | 49.7 | 24.2 | 13.9 | | | | |
| @ 90° | 11 | | | | 15.7 | 7.0 | 20.8 | | | | |
| @ 45° | 14 | | | | 17.4 | 7.4 | 13.1 | | | | |
| Flexural Modulus (MPa) | | | | | | | | | | | |
| @ 0° | 33.5 | | | 40.9 | 1468 | 993 | 237 | | | | |
| @ 90° | 37.1 | | | | 516 | 292 | 384 | | | | |
| @ 45° | 44.9 | | | | 450 | 333 | 280 | | | | |
| Suture pull-out force (N) | | | | | | | | | | | |
| @ 0° | 15 | 14 | | | 36.8 | 20.6 | 29.1 | | 0.7 | | 2.4 |
| @ 90° | 16 | 14 | | | 34.0 | 18.6 | 19.0 | | 0.3 | | 2.4 |
| Surface roughness (μm) | | | | | | | | | | | |
| Sa | 14.1 | 17.1 | 25.5 | 24.5 | 6.0 | 7.0 | 9.4 | 3.7 | 4.0 | 2.0 | 12 |
| Sz | 113 | 120.7 | 217 | 204 | 54.3 | 69.1 | 97.3 | 37.0 | 33.5 | 67.9 | 104 |

Figure 2:
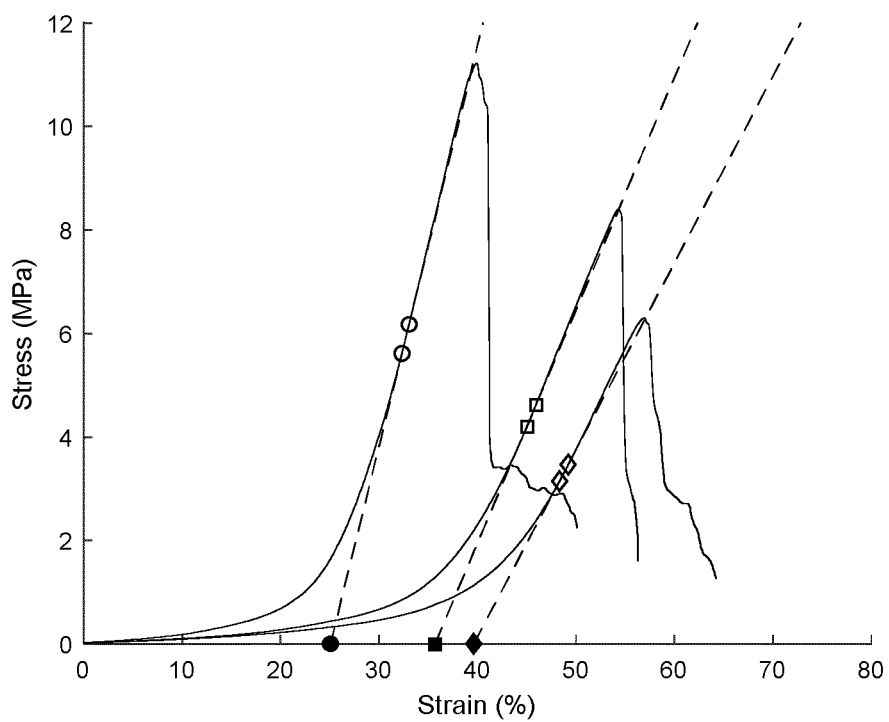
FIG. 2 represents stress-strain curves as measured on test samples cut from a sheet of treated pericardium.

The unreinforced sheet of Comparative Example 7 showed tensile properties that are substantially independent on direction. The results provided in Table 2 for CE 9, listed for 45° direction, represent averaged values of all measurements, as there is no specific orientation in this material. The pericardium sheet of Comparative Example 6 showed not only different averaged values when measured on samples cut from the sheet in different orientations, but also quite some variation between different tensile samples. That this natural product is not uniform is further illustrated by the three representative stress-strain curves as shown in FIG. 2.

For the composite sheets based on woven fabrics (CE 1-4), the results show non-linear tensile behavior, especially by a hardening transition point in directions at an angle with warp and weft strands of the woven fabric, but not for the sheet based on a porous film (CE 5). This demonstrates that relevant tensile properties of a composite sheet may show similarity to properties of a pericardium sheet, when measured under the same physiological-like conditions and at an angle of about 45° relative to warp or weft direction of the woven contained in the composite. However, such composites do not resemble pericardium in the warp (0°) or weft (90°) directions.

Figure 4:
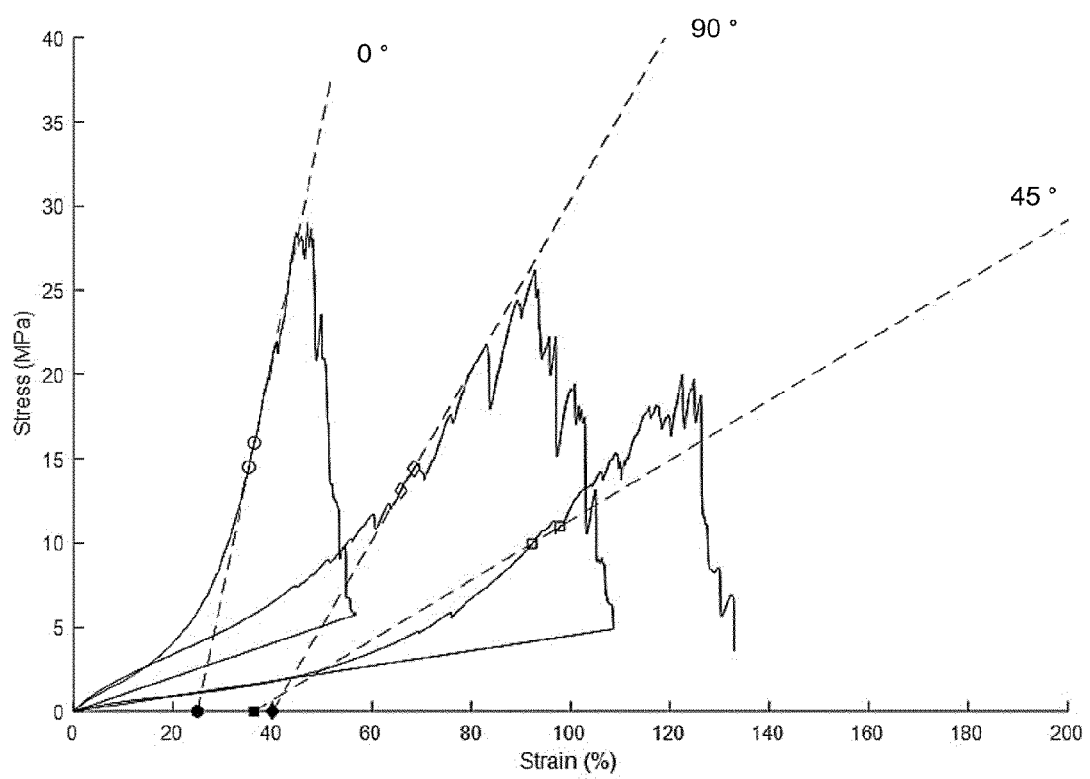
FIG. 4 shows stress-strain curves measured on the composite sheet of Example 1, containing a mesh knit fabric, in machine direction (0°), and at angles of 90° and 45° thereto.
Figure 5:
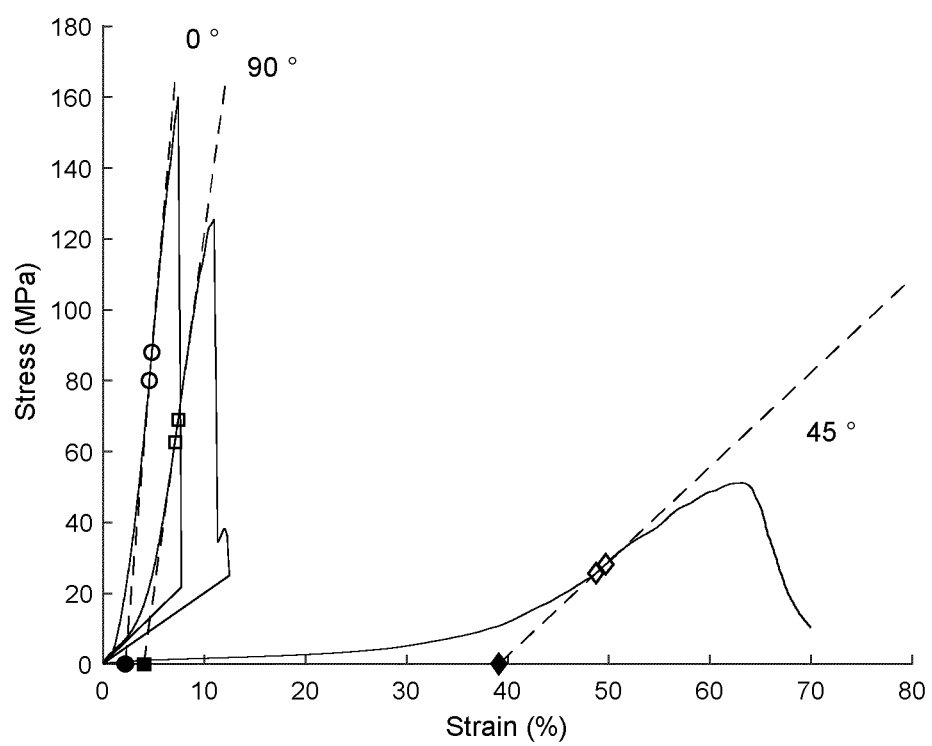
FIG. 5 shows stress-strain curves measured on the composite sheet based on a woven fabric of CE 3; in warp direction (0°), weft direction (90°), and at angle of 45° with warp and weft.

The composite sheets reinforced with knit fabrics (Ex 1-4), however, are found to have properties much closer to pericardium across the wale (0°), course (90°), and 45° directions than the composites reinforced with woven fabrics. Such knit fabrics demonstrate, for example, lower moduli, hardening transitions at higher elongation, and with properties being less dependent on the direction in which force is applied. This is further illustrated by comparing FIG. 2 (for pericardium) and FIG. 5 (CE 3) with FIG. 4 (Example 1), especially for the secant modulus and strain hardening. Further, the knit composites of Examples 1-4 show a 1% Secant modulus in each of the 0°, 90°, and 45° directions that are significantly less and more uniform than the composites comprising a woven fabric of Comparative Examples 1-5.

In addition, the composite sheets of Ex. 1-4 have ultimate tensile strength and elongation that are more comparable to the tested pericardium; in any direction. This means that, if such composite sheet would be used as the material from which leaflets of a prosthetic valve are made, the maximum stress exerted on the material when in use as an implant will remain below the level of stress that could induce immediate rupture. It is accepted in the art that in such case a material will be more resistant to fatigue failure and will show significantly longer fatigue lifetime. Therefore, a significant improvement in durability of a prosthetic valve having leaflets made from such composite sheet according to present disclosure may be expected over prior art bioprosthetic and/or synthetic valves. Fatigue evaluation experiments to determine an expected lifetime of leaflets made from composite sheets of the disclosure are still pending.

The flexural properties of a material that is to be used, for example as a leaflet in a heart valve prosthesis, are important for efficient opening and closing, affecting for example, the flow of blood. The results on flexural rigidity and other mechanical properties (see Table 2) indicate that the composites based on knit fabrics, although having a relatively high thickness compared to those based on woven fabrics, show improved pliability. These improvements are indicated for example, by the knit composite of Example 1 demonstrating lower maximum flexural rigidity per unit width in each of the 0°, 90°, and 45° directions than the composites comprising a woven fabric of Comparative Examples 1-5.

The composites comprising a knit fabric show significantly higher surface roughness over the composites comprising a woven fabric. This is believed to be because the knit fabric requires that in certain locations three strands of yarn overlap vs. a maximum of only two strands in the woven fabric. Thus, there is a larger difference between the pores of the fabric, where only the polyurethane coating, and the areas where strands overlap. A composite sheet can also be made to have one side having a smoother surface than the other, for example by making or post-treating a sheet on a support or mandrel having a smooth surface.

Based on these experiments, the inventive composites based on knit fabrics provide improved multi-directional performance over composites based on woven fabrics. Such improved performance may be in terms of improved mechanical properties themselves or in improved uniformity of properties to more closely mimic pericardium tissue.

In a future experiment, the inventors expect to assess composites comprising a knit fabric of 10 dtex UHMWPE yarn and a polyurethane coating. It expected that such composites will achieve similar properties in a thinner composite having a more uniform thickness. Such a composite sheet also likely results in a sheet having a lower surface roughness, yet still a low flexural rigidity per unit width. Moreover, it is believed that a composite sheet could be formed and could be achieved having at least one surface having a Sa of less than 12 μm and an Sz of less than 100 μm. This may be achieved by utilizing higher quantities of polyurethane such that the polyurethane coating is thinner in the locations where the strands overlap and a thicker coating in the locations corresponding to the pores of the knit fabric.

The following non-limiting and non-exhaustive description of exemplary embodiments is intended to further describe certain embodiments of the invention.

1. A composite sheet having a thickness of 25-250 μm and comprising:
   a. 10-70 mass %, based on the total mass of the composite sheet, of a knit fabric having thickness of 15-225 μm and comprising strands of 2-50 dtex, the strands comprising biocompatible polymer fibers, wherein the fabric comprises a thickness in a plurality of first locations, and pores in a plurality of second locations; and
   b. 30-90 mass %, based on the total mass of the composite sheet, of a polyurethane coating, wherein the polyurethane coating coats the fabric and fills the pores of the fabric such that the composite sheet is substantially impermeable to water.

2. The composite sheet according to any one of the previous exemplary embodiments, wherein the arithmetic mean height of the surface (Sa) of a first side of the composite sheet is 10 μm or more and the maximum height of the surface (Sz) of a first side of the composite sheet is 100 μm or more.

3. The composite sheet according to any one of the previous exemplary embodiments, wherein the arithmetic mean height of the surface (Sa) of a first side of the composite sheet is 10, 11, 12, 13 or 14 μm or more.

4. The composite sheet according to any one of the previous exemplary embodiments, wherein the arithmetic mean height of the surface (Sa) of a first side of the composite sheet is from 10 μm to 30, 29, 28, 27, 26, 25, 24, 23, 22, 21, 20, 19, or 18 μm.

5. The composite sheet according to any one of the previous exemplary embodiments, wherein the maximum height of the surface (Sz) of a first side of the composite sheet is 100, 105, or 110 μm or more.

6. The composite sheet according to any one of the previous exemplary embodiments, wherein the maximum height of the surface (Sz) of a first side of the composite sheet is from 100 μm to 300, 290. 280, 270, 260, 250, 240, 230, or 220 μm.

7. The composite sheet according to any one of the previously exemplary embodiments, wherein the fabric comprises strands of 20-50 dtex.

8. The composite sheet according to any one of the previously exemplary embodiments, wherein the fabric comprises strands of 20-30 dtex.

9. The composite sheet of any one of exemplary embodiments 1-5, wherein the fabric comprises strands of from 2-15 dtex and wherein the maximum height of the surface (Sz) of a first side of the composite sheet is 2, 5, 10, 25, 50, or 100 μm or more.

10. The composite sheet according to the previous exemplary embodiment, wherein the maximum height of the surface (Sz) of a first side of the composite sheet is 250, 200, 150, 100, or 75, μm or less.

11. A composite sheet having a thickness of 25-200 μm and comprising:
    a. 10-70 mass %, based on the total mass of the composite sheet, of a knit fabric having thickness of 15-125 μm and comprising strands of 2-15 dtex, the strands comprising biocompatible polymer fibers, wherein the fabric comprises a thickness in a plurality of first locations corresponding to the crossing of one or more strands to result in a thickness at least three times the thickness of one strand, and pores in a plurality of second locations; and
    b. 30-90 mass %, based on the total mass of the composite sheet, of a polyurethane coating, wherein the polyurethane coating coats the fabric and fills the pores of the fabric such that the composite sheet is substantially impermeable to water.

12. The composite sheet according to any one of the previous exemplary embodiments, wherein the composite sheet comprises a first side having a first roughness that corresponds to the differences in thickness of the composite sheet between the plurality of first locations and the plurality of second locations.

13. The composite sheet according to any one of the previous exemplary embodiments, wherein the composite sheet comprises a second side having a second roughness, wherein the first roughness is greater than the second roughness.

14. The composite sheet according to any one of the previous exemplary embodiments, wherein the composite sheet comprises a first side having a first roughness that corresponds to the differences in thickness of the composite sheet between the plurality of first locations and the plurality of second locations, and a second side having a second roughness, wherein the first roughness is greater than the second roughness.

15. The composite sheet according to any one of the previous exemplary embodiments, wherein the roughness of the composite sheet is characterized by the combination of arithmetic mean height of the surface (Sa) of the composite sheet and the maximum height of the surface (Sz) of the composite sheet.

16. The composite sheet according to the previous exemplary embodiment, wherein the thickness of the composite sheet at the one or more first locations is substantially equivalent to the thickness of the composite sheet at the one or more second locations as characterized by having an arithmetic mean height of the surface (Sa) of both sides of the composite sheet of from 2 to 12 μm and the maximum height of the surface (Sz) of both sides of the composite sheet of from 2 to 100 μm.

17. The composite sheet according to any one of the previous exemplary embodiments, wherein the thickness in the plurality of first locations corresponds to the stacking of one or more strands at the plurality of first locations.

18. The composite sheet according to any one of the previous exemplary embodiments, wherein the first locations correspond to the interconnection of a loop of one or more strands with the same or a different strand.

19. The composite sheet according to any one of the previous exemplary embodiments, wherein the maximum thickness of the fabric is at one or more of the first locations.

20. The composite sheet according to any one of the previous exemplary embodiments, wherein the maximum thickness of the fabric is at the plurality of first locations.

21. The composite sheet according to any one of the previous exemplary embodiments, wherein the first locations of the knit fabric have a thickness equivalent to the thickness of 3 strands.

22. The composite sheet according to any one of the previous exemplary embodiments, wherein the first locations of the composite sheet have a thickness equivalent to the thickness of 3 strands plus the thickness of the polyurethane coating.

23. The composite sheet according to any one of the previous exemplary embodiments, wherein the fabric has a thickness of at least three times the diameter of a strand in a plurality of first locations.

24. The composite sheet according to any one of the previous exemplary embodiments, wherein the fabric has an areal density of from 5 to 30 g/m$^2$.

25. The composite sheet according to any one of the previous exemplary embodiments, wherein the fabric has an areal density of at most 26, 24, 22, 20, 19, 18, 17, 16 or 15 g/m$^2$ and at least 6, 7, 8, 9, or 10 g/m$^2$.

26. The composite sheet according to any one of the previous exemplary embodiments, wherein the composite sheet has an areal density of from 10 to 100 g/m$^2$.

27. The composite sheet according to any one of the previous exemplary embodiments, wherein the composite sheet has a 1% secant modulus of from 1 to 100 MPa in each of two orthogonal directions and the diagonal thereof.

28. The composite sheet according to any one of the previous exemplary embodiments, wherein the composite sheet has a 1% secant modulus of from 1, 2, 3, 4, or 5 to 100, 90, 80, 75, 70, or 65 MPa in each of two orthogonal directions and the diagonal thereof.

29. The composite sheet according to any one of the previous exemplary embodiments, wherein the composite sheet has a 1% secant modulus of from 1 to 100 MPa in all directions.

30. The composite sheet according to any one of the previous exemplary embodiments, wherein the composite sheet has a 1% secant modulus of from 1, 2, 3, 4, or 5 to 100, 90, 80, 75, 70, or 65 MPa in all directions.

31. The composite sheet according to any one of the previous exemplary embodiments, wherein the composite sheet has a hardening transition point of from 5 to 75% in each of two orthogonal directions and the diagonal thereof.

32. The composite sheet according to any one of the previous exemplary embodiments, wherein the composite sheet has a hardening transition point of from 5 to 75% in all directions.

33. The composite sheet according to any one of the previous exemplary embodiments, wherein the composite sheet has a flexural rigidity per unit width of from 1 to 20 N·μm in each of two orthogonal directions and the diagonal thereof.

34. The composite sheet according to any one of the previous exemplary embodiments, wherein the composite sheet has a flexural rigidity per unit width of from 1 to 20 N·μm in all directions.

35. The composite sheet according to any one of the previous exemplary embodiments, wherein the composite sheet has a flexural rigidity per unit width of from 1, 2, 3, 4, 5, 6, 7, 8, 9, or 10 N·μm to 20, 19, 18, 17, 16, 15, 14, 13, 12, or 11 N·μm in each of two orthogonal directions and the diagonal thereof.

36. The composite sheet according to any one of the previous exemplary embodiments, wherein the composite sheet has a flexural rigidity per unit width of from 1, 2, 3, 4, 5, 6, 7, 8, 9, or 10 N·μm to 20, 19, 18, 17, 16, 15, 14, 13, 12, or 11 N·μm in all directions.

37. The composite sheet according to any one of the previous exemplary embodiments, wherein the composite sheet has a flexural modulus of from 10, 15, 20, 25, or 30 MPa to 200, 190, 180, 170, 160, 150, 140, 130, 120, 110,100, 90, 80, 70, 60, or 50 MPa in each of two orthogonal directions and the diagonal thereof.

38. The composite sheet according to any one of the previous exemplary embodiments, wherein the composite sheet has a flexural modulus of from 10, 15, 20, 25, or 30 MPa to 200, 190, 180, 170, 160, 150, 140, 130, 120, 110,100, 90, 80, 70, 60, or 50 MPa in all directions.

39. The composite sheet according to any one of the previous exemplary embodiments, wherein the knit fabric is a warp knit.

40. The composite sheet according to any one of the previous exemplary embodiments, wherein the knit fabric is a raschel knit.

41. The composite sheet according to any one of the previous exemplary embodiments, wherein the knit fabric is a weft knit.

42. The composite sheet according to any one of the previous exemplary embodiments, wherein the knit fabric is a mesh.

43. The composite sheet according to any one of the preceding exemplary embodiments, wherein the knit fabric is a mesh having mesh openings of 25-250 μm.

44. The composite sheet according to any one of the preceding exemplary embodiments, wherein the knit fabric is a mesh fabric having mesh openings of from 25, 50, or 75 μm to 200, 175, 150, or 125 μm.

45. The composite sheet according to any one of the preceding exemplary embodiments, wherein the fabric has a thickness of at most 175, 150, 125, or 100, 90, 80 or 75 μm and at least 15, 20, 25, 30, 35, 40 45, or 50 μm.

46. The composite sheet according to any one of the preceding exemplary embodiments, wherein the fabric has a thickness of 20-125 μm.

47. The composite sheet according to any one of the preceding exemplary embodiments, wherein the strands are from 2 to 15 dtex.

48. The composite sheet according to any one of the preceding exemplary embodiments, wherein the fabric consists of strands having at least one multi-filament yarn.

49. The composite sheet according to any one of the preceding exemplary embodiments, wherein the fabric comprises strands having a tenacity of at least 0.6-4.5 N/tex.

50. The composite sheet according to any one of the preceding exemplary embodiments, wherein the fabric consists of strands comprising a UHMWPE yarn.

51. The composite sheet according to any one of the preceding exemplary embodiments, wherein the fabric comprises strands comprising a UHMWPE yarn with a tenacity of 1.5-4.5 N/tex.

52. The composite sheet according to any one of the preceding exemplary embodiments, wherein the fabric comprises at least 50 mass % of strands having a tenacity of at least 0.6-4.5 N/tex.

53. The composite sheet according to any one of the preceding exemplary embodiments, wherein the fabric consists of strands of a UHMWPE yarn with a tenacity of 1.5-4.5 N/tex.

54. The composite sheet according to any one of the preceding exemplary embodiments, wherein the polyurethane comprises a biocompatible and biostable polyurethane elastomer comprising polysiloxane segments.

55. The composite sheet according to any one of the preceding exemplary embodiments, wherein the polyurethane comprises a biocompatible and biostable polyurethane elastomer comprising polysiloxane segments and polycarbonate segments.

56. A valve prosthesis comprising a leaflet comprising the composite sheet according to any one of the preceding exemplary embodiments.

57. A valve prosthesis comprising a skirt or cuff comprising the composite sheet according to any one of the preceding exemplary embodiments.

58. A valve prosthesis comprising a leaflet, commissure, and skirt formed from a single composite sheet according to any one of the preceding exemplary embodiments.

59. An implantable medical device comprising the composite sheet according to any one of the preceding exemplary embodiments.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. While certain optional features are described as embodiments of the invention, the description is meant to encompass and specifically disclose all combinations of these embodiments unless specifically indicated otherwise or physically impossible.

The invention claimed is:

1. A composite sheet having a thickness of 25-250 μm and comprising:
   (a) 10-70 mass %, based on the total mass of the composite sheet, of a knit fabric having thickness of 15-225 μm and comprising strands of 2-50 dtex, the strands comprising biocompatible polymer fibers, the strands comprising biocompatible polymer fibers, wherein the fabric comprises a thickness in a plurality of first locations, and pores in a plurality of second locations; and
   (b) 30-90 mass %, based on the total mass of the composite sheet, of a polyurethane coating, wherein the polyurethane coating coats the fabric and fills the pores of the fabric such that the composite sheet is substantially impermeable to water; wherein
   the composite sheet has a 1% secant modulus of from 1 to 100 MPa and a hardening transition point of from 5 to 75% in each of two orthogonal directions and the diagonal thereof.

2. A composite sheet having a thickness of 25-250 μm and comprising:
   (a) 10-70 mass %, based on the total mass of the composite sheet, of a knit fabric having thickness of 15-225 μm and comprising strands of 2-50 dtex, the strands comprising biocompatible polymer fibers, the strands comprising biocompatible polymer fibers, wherein the fabric comprises a thickness in a plurality of first locations, and pores in a plurality of second locations; and
   (b) 30-90 mass %, based on the total mass of the composite sheet, of a polyurethane coating, wherein the polyurethane coating coats the fabric and fills the pores of the fabric such that the composite sheet is substantially impermeable to water; wherein
   the composite sheet has a flexural rigidity per unit width of from 1 to 20 N·μm in each of two orthogonal directions and the diagonal thereof.

3. The composite sheet according to claim 1, wherein the composite sheet has a 1% secant modulus of from 1 to 100 MPa and a hardening transition point of from 5 to 75% in all directions.

4. The composite sheet according to claim 1, wherein the composite sheet has a flexural rigidity per unit width of from 1 to 20 N·μm in all directions.

5. The composite sheet according to claim 1, wherein the composite sheet has a flexural modulus of from 10 to 200 MPa in each of two orthogonal directions and the diagonal thereof.

6. The composite sheet according to claim 1, wherein the thickness in the plurality of first locations corresponds to the stacking of one or more strands at the plurality of first locations.

7. The composite sheet according to claim 1, wherein the composite sheet comprises a first side having a first roughness that corresponds to the differences in thickness of the composite sheet between the plurality of first locations and the plurality of second locations, and a second side having a second roughness, wherein the first roughness is greater than the second roughness.

8. The composite sheet according to claim 1, wherein the first locations correspond to the interconnection of a loop of one or more strands with the same or a different strand.

9. The composite sheet according to claim 1, wherein the knit fabric is a mesh having mesh openings of 25-250 μm.

10. The composite sheet according to claim 1, wherein the knit fabric is a warp knit.

11. The composite sheet according to claim 1, wherein the knit fabric is a raschel knit.

12. The composite sheet according to claim 1, wherein the knit fabric has a thickness of 15-125 μm and comprises strands of 2-15 dtex.

13. The composite sheet according to claim 1, wherein the composite sheet has a thickness of from 25 to 200 μm.

14. The composite sheet according to claim 1, wherein the fabric consists of strands comprising a UHMWPE yarn.

15. The composite sheet according to claim 1, wherein the polyurethane comprises a biocompatible and biostable polyurethane elastomer comprising polysiloxane segments and polycarbonate segments.

16. A valve prosthesis comprising a leaflet comprising the composite sheet according to claim 1.

* * * * *